US011048823B2

(12) United States Patent
Runkis et al.

(10) Patent No.: US 11,048,823 B2
(45) Date of Patent: Jun. 29, 2021

(54) SECURE FILE SHARING OVER MULTIPLE SECURITY DOMAINS AND DISPERSED COMMUNICATION NETWORKS

(71) Applicant: BITSPRAY CORPORATION, Clinton, MS (US)

(72) Inventors: Walter H. Runkis, Clinton, MS (US); Donald E. Martin, Neptune Beach, FL (US); Jeffrey J. Bromberger, Omaha, NE (US); Peter A. Scott, Boulder, CO (US)

(73) Assignee: BITSPRAY CORPORATION, Clinton, MS (US)

( * ) Notice: Subject to any disclaimer, the term of this patent is extended or adjusted under 35 U.S.C. 154(b) by 249 days.

(21) Appl. No.: 15/454,669

(22) Filed: Mar. 9, 2017

(65) Prior Publication Data
US 2017/0262655 A1  Sep. 14, 2017

Related U.S. Application Data

(60) Provisional application No. 62/305,918, filed on Mar. 9, 2016.

(51) Int. Cl.
G06F 21/62 (2013.01)
H04L 29/06 (2006.01)
(Continued)

(52) U.S. Cl.
CPC .......... *G06F 21/6263* (2013.01); *G06F 21/31* (2013.01); *H04L 9/0833* (2013.01);
(Continued)

(58) Field of Classification Search
CPC ..... H04L 63/0421; H04L 63/18; H04L 9/085; H04L 9/0894; G06F 21/6245; G06F 21/6254
See application file for complete search history.

(56) References Cited

U.S. PATENT DOCUMENTS

| 5,485,474 A | 1/1996 | Rabin |
| 5,572,206 A | 11/1996 | Miller |

(Continued)

FOREIGN PATENT DOCUMENTS

| JP | 11-134259 | 5/1999 |
| JP | 2002-312225 | 10/2002 |

(Continued)

OTHER PUBLICATIONS

Philipe Beguin et al.; General information dispersal algorithms; Philipe Beguin Theoretical Computer Science 209 (1998) pp. 87-105.

(Continued)

*Primary Examiner* — Zachary A. Davis
(74) *Attorney, Agent, or Firm* — DLA Piper LLP US

(57) ABSTRACT

Disclosed is a system and method of obtaining data in a system in which share volumes of the data are dispersed across a communication network. A first computer requesting the data forwards the request to a second computer. The second computer determines if another computer has reassembled the data, and if so, responds to the first computer that the request cannot be granted. Otherwise, the second computer enables the first computer to access personal information associated only with a user of the first computer that authorizes the user to access the data. The personal information is used to determine reassembly information necessary to reassemble the data. The reassembly information is used to reassemble the data. The personal information may then be destroyed. The reassembled data is dispersed across the communication network. New personal information is created for the user.

18 Claims, 9 Drawing Sheets

(51) Int. Cl.
  *H04L 9/32*     (2006.01)
  *G06F 21/31*    (2013.01)
  *H04L 9/08*     (2006.01)
  *H04W 12/06*    (2021.01)
  *H04W 12/069*   (2021.01)
  *H04M 1/2755*   (2006.01)

(52) U.S. Cl.
  CPC .......... *H04L 9/0894* (2013.01); *H04L 9/3213* (2013.01); *H04L 9/3226* (2013.01); *H04L 9/3263* (2013.01); *H04L 63/083* (2013.01); *H04L 63/18* (2013.01); *H04W 12/068* (2021.01); *H04W 12/069* (2021.01); *H04M 1/2755* (2013.01)

(56) References Cited

U.S. PATENT DOCUMENTS

| | | | |
|---|---|---|---|
| 5,600,726 A | | 2/1997 | Morgan et al. |
| 5,933,824 A | | 8/1999 | Dekoning |
| 5,991,414 A | | 11/1999 | Garay |
| 6,141,530 A | | 10/2000 | Rabowsky |
| 6,192,472 B1 | | 2/2001 | Garay |
| 6,243,496 B1 | | 6/2001 | Wilkinson |
| 6,253,337 B1 | | 6/2001 | Maloney et al. |
| 6,260,040 B1 | * | 7/2001 | Kauffman ............... G06F 16/10 |
| 6,718,427 B1 | | 4/2004 | Carlson et al. |
| 6,983,016 B2 | | 1/2006 | Hourunranta |
| 7,328,160 B2 | | 2/2008 | Nishio et al. |
| 7,391,865 B2 | | 6/2008 | Orsini et al. |
| 8,009,830 B2 | | 8/2011 | Orsini |
| 8,184,310 B2 | * | 5/2012 | Nemoto ............. G06F 21/6218 358/1.14 |
| 8,555,079 B2 | * | 10/2013 | Shablygin ............... G06F 21/34 713/185 |
| 8,613,045 B1 | | 12/2013 | Shigapov et al. |
| 8,700,890 B2 | | 4/2014 | Runkis et al. |
| 8,910,117 B2 | * | 12/2014 | Li ............................ G06F 8/71 717/120 |
| 9,575,979 B1 | * | 2/2017 | McClintock ........ G06F 21/6218 |
| 9,674,280 B1 | * | 6/2017 | Hart ................... G06Q 30/0643 |
| 9,971,786 B2 | * | 5/2018 | Ables .................... G06F 16/178 |
| 2002/0094025 A1 | | 7/2002 | Hanamura et al. |
| 2002/0144152 A1 | | 10/2002 | Ikeda |
| 2003/0149869 A1 | | 8/2003 | Gleichauf |
| 2005/0219611 A1 | | 10/2005 | Yamashita et al. |
| 2006/0171463 A1 | | 8/2006 | Hanamura et al. |
| 2007/0005795 A1 | | 1/2007 | Gonzalez et al. |
| 2007/0160198 A1 | | 7/2007 | Orsini et al. |
| 2007/0201540 A1 | | 8/2007 | Berkman |
| 2009/0048976 A1 | | 2/2009 | Hars |
| 2009/0222509 A1 | * | 9/2009 | King ..................... G06F 16/182 709/203 |
| 2010/0049823 A1 | | 2/2010 | Saigo et al. |
| 2010/0109907 A1 | | 5/2010 | Sharma |
| 2010/0306524 A1 | | 12/2010 | Runkis et al. |
| 2013/0246812 A1 | | 9/2013 | Resch et al. |
| 2013/0268774 A1 | | 10/2013 | O'Hare et al. |
| 2013/0268931 A1 | | 10/2013 | O'Hare et al. |
| 2014/0297654 A1 | | 10/2014 | Resch et al. |
| 2014/0380093 A1 | | 12/2014 | Molaro et al. |
| 2015/0294118 A1 | * | 10/2015 | Parker ................... G06F 21/606 726/26 |
| 2015/0317099 A1 | | 11/2015 | Resch |
| 2015/0317205 A1 | | 11/2015 | Gray |
| 2015/0319244 A1 | | 11/2015 | Resch |
| 2017/0060480 A1 | | 3/2017 | Gray |

FOREIGN PATENT DOCUMENTS

| | | |
|---|---|---|
| JP | 2002-358257 | 12/2002 |
| JP | 2003-296179 | 10/2003 |
| JP | 2003-316652 | 11/2003 |
| JP | 2005-267431 | 9/2005 |
| JP | 2006-048158 | 2/2006 |
| JP | 2006-293583 | 10/2006 |
| JP | 2007-329940 | 12/2007 |
| JP | 2008-046860 | 2/2008 |
| WO | WO 2004/028142 | 4/2004 |
| WO | WO 2007/111086 | 10/2007 |
| WO | WO 2007/144215 | 12/2007 |

OTHER PUBLICATIONS

Michael O. Rabin, Apr. 1989, entitled "Efficient Dispersal of Information for Security, Load Balancing, and Fault Tolerance,"; Journal of the ACM.
EP Office Action in Application 10 781 330.5 dated Feb. 20, 2019.
European Search Report in EP Application No. 17764120 dated Sep. 20, 2019.
European Search Report in EP Application No. 17764120 dated Jan. 29, 2020.
European Search Report in EP Application No. 15776215.4 dated Aug. 11, 2020.
Australian Examination Report dated Nov. 19, 2018 in Application 2015243877.
C. Tshudin et al., "Network Pointers," ACM SIGCOMM Computer Communications Review, vol. 33, No. 1, pp. 23-27, Jan. 2003, see chapter 2.
A. Harrington et al., "Cryptographic Access Control in a Distributed File System," SACMAT'03, pp. 158-165, Jun. 3, 2003, See Chapter 3: figure 2.
S. Pearson, "Taking Account of Privacy when Designing Cloud Computing Services," Proceedings of the 2009 ICSE Workshop on Software Engineering Challenges of Cloud Computing, pp. 44-52, May 23, 2009, see chapter 5.
G. Ateniese, et al., "Improved Re-encryption Schemes with Applications to Secure Distributed Storage," ACM Transactions on Information and System Security, vol. 9, No. 1, pp. 1-30, see chapter 3.
International Search Report issued in PCT/US2010/036703 dated Apr. 27, 2011.
Written Opinion issued in PCT/US2010/036703 dated Apr. 27, 2011.
International Search Report issued in PCT/US2015/024935 dated Jul. 20, 2015.
Written Opinion issued in PCT/ US2015/024935 dated Jul. 20, 2015.
International Search Report issued in PCT/US2017/021619 dated Jul. 17, 2017.
Written Opinion issued in PCT/ US2017/021619 dated Jul. 17, 2017.
Supplementary European Search Report issued in EP 15 77 6215 dated Oct. 24, 2017.
English Language Abstract for JP 11-134259 published May 21, 1999.
English Language Abstract for JP 2005/267431 published Sep. 29, 2005.
U.S. Appl. No. 12/790,495.
U.S. Appl. No. 14/249,273.
U.S. Appl. No. 14/249,268.

* cited by examiner

Fig. 5b

| Organize ▶ | ⟦BSX_BIG_Batch_Level 2A ▶ | Include in library ⇪ ▶ | ⇅ | ⊓. | Search | — | □ | ✕ |
|---|---|---|---|---|---|---|---|---|

| Name | Date Modified | Type |
|---|---|---|
| ⟦ Level 2A-1 | 9/7/2015 4:21 PM | File Folder |
| ⟦ Level 2A-2 | 9/7/2015 4:21 PM | File Folder |
| ⓑ 373032-000002-PCT PUBLISHED APPLICA... | 9/7/2015 4:21 PM | BitSpray Sys |
| ⓑ BitSpray Features and Benefits 141207.pd... | 9/7/2015 4:21 PM | BitSpray Sys |
| ⓑ BitSpray Media Protection Strategies 120... | 9/7/2015 4:21 PM | BitSpray Sys |
| ⓑ BitSpray Technical Paper [Final].pdf.bsx | 9/7/2015 4:21 PM | BitSpray Sys |
| ⓑ BitSpray Technical Spec 2013-bsx.pdf.bsx | 9/7/2015 4:21 PM | BitSpray Sys |
| ⓑ BitSpray VTC Overview 14016.pdf.bsx | 9/7/2015 4:21 PM | BitSpray Sys |
| ⓑ BitSpray White Paper GDVD.pdf.bsx | 9/7/2015 4:21 PM | BitSpray Sys |
| ⓑ BitSpray_In_A_Nutshell.pdf.bsx | 9/7/2015 4:21 PM | BitSpray Sys |

SECURE FILE SHARING OVER MULTIPLE SECURITY DOMAINS AND DISPERSED COMMUNICATION NETWORKS

CROSS-REFERENCE TO RELATED APPLICATIONS

This application claims priority to U.S. Provisional Application No. 62/305,918 filed Mar. 9, 2016, which is incorporated by reference in its entirety.

FIELD

The present disclosure is directed to the field of sharing information among users over geographically separated dispersed communication networks and, more particularly, toward systems and methods of protecting information being transmitted and stored across a dispersed communication network from unauthorized access, theft, loss, or vandalism while facilitating open access to information among a plurality of users and groups of users. Since information protected by embodiments of this disclosure is transmitted and stored across dispersed communication networks, the network itself becomes a "cryptographic communication network" by means of the interaction of its manifold techniques and components.

BACKGROUND OF THE INVENTION

The trend in communication network architecture today is to migrate "bare metal" network topologies to virtual cloud-based alternatives. For a number of reasons there is also a desire to leverage shared computing infrastructures (e.g., networks, servers, clients, and applications) to support transient limited access workflows. A significant challenge is our ability (or inability) to effectively and economically support an increasing number of security compartments. The traditional approach has been to establish a dedicated computing environment, primarily physically separate, to support limited access information compartmentalization. For example, assuming a classified local area network is based on Cisco networking technology, and Microsoft based servers and clients, all users have access to substantially all security compartments such as, for example, Compartment Z, and all computing resources, data services, and tools in Compartment Z. A subset of those users are supporting projects that require access to the tools and/or data housed within Compartment A, B or C or some combination thereof. Those users need to interact with the common tools and data in Compartment Z as well as the unique compartments related to their activities. The tools and data within the A/B/C compartments must remain limited to those persons with access. Compartment Z will persist. Compartment A/B/C are transient (i.e., stand up, stand down, go away, or replaced by another).

Network Compartmentalization, the division of network functionality into network compartments, is an important concept of Autonomic Networking. Autonomic Networking follows the concept of Autonomic Computing, an initiative started by IBM in 2001. Its ultimate aim is to create self-managing networks to overcome the rapidly growing complexity of the Internet and other networks, and to enable them beyond the size of today. Network Compartments implement the operational rules and administrative policies for a given communication context. The boundaries of a communication context, and hence the compartment boundaries, are based on technological and/or administrative boundaries. For example, compartment boundaries can be defined by a certain type of network technology (e.g., a specific wireless access network) or based on a particular communication protocol and/or addressing space (e.g., an IPv4 or IPv6 network), but also based on a policy domain (e.g., a national health network that requires a highly secure boundary).

A compartment's communication principles, protocols and policies form a sort of "recipe" that all compartment entities must obey. For example, the recipe defines how to join a compartment, who can join, and how the naming, addressing and routing is handled. The complexity and details of the internal operation is left to each compartment. For example, registration with a compartment can range from complex trust-based mechanisms to simple registration schemes with a central database or a public Distributed Hash Table (DHT)—based system; resolution of a communication peer can be handled implicitly by the compartment's naming and addressing scheme or require explicit actions (e.g., resolution of an identifier to a locator). It is important to note here that compartments have full autonomy on how to handle the compartment's internal communication—i.e. there are no global invariants that have to be implemented by all compartments or all communication elements.

Members of a compartment are able and willing to communicate among each other according to compartment's operational and policy rules. Conceptually a compartment maintains some form of implicit database which contains its members; that is, each entry in the database defines a member. Before one can send a data packet to a compartment member, a resolution step is required which returns a means to "address" the member. Note that the above definition does not specify whether a member is a node, a set of servers or a software module. This rather abstract definition of compartment membership permits capture of many different flavors of members and communication forms.

Current approaches require duplication of computing resources (networks, servers, clients, applications and data) to support Compartment A, B, or C. The goal is to create a technology that allows the additional compartments to share the compute resources of Compartment Z with the unique data and tools being established for each sub-compartment. The approach may maintain the confidentiality and integrity of all compartments (i.e., not exposing or spilling the data or tools). Such compartmented duplication of security domains and computing resources may be expensive and cumbersome to manage and maintain.

The desire in military, intelligence, government, and large-scale commercial enterprises may be to virtualize the computing environment, collapse network compartments and layers, and move bare metal infrastructures to the cloud in so far as that is practicable.

One component for a cloud implementation is user authentication. One popular method of authentication is using a network management tool, such as Windows Active Directory, and another is MIT's Kerberos. MIT released its Kerberos software as Open Source in 1987 and has been enhancing it ever since. Kerberos is a computer network authentication protocol that uses 'tickets' to allow nodes communicating over a non-secure network to prove their identity to one another in a secure manner. The protocol was named after the character Kerberos (or Cerberus) from Greek mythology, the ferocious three-headed guard dog or hellhound. Its design is aimed primarily at a client-server model for which it provides mutual authentication—both the user and the server verify each other's identity.

Operating systems, such as Microsoft Windows, may implement Kerberos in Active Directory. The moment a user logs into a Windows client that is a part of a computer network, such as Windows Server network, Active Directory uses Kerberos to authenticate that user by means of an RC4 stream cipher. In a Windows-based network, Kerberos is also used when a client authenticates into a machine with network shared partitions and applications. When a user inputs a username and password into an Active Directory login, a one-way hash is generated from the password, so that the password can be transmitted in ciphertext as opposed to plaintext. Then the hash is sent to the authentication server. If it is a match for that user, a Ticket to Get Tickets (TGT) is created by the Ticket Granting Service (TGS). Both the Authentication System (AS) and the TGS are components of Microsoft's Key Distribution Center, but they are separate. Because they are separate, the user's TGT may be used to acquire tickets from a TGS in another domain.

Historically, both the MIT and Windows implementations of Kerberos have fallen prey to vulnerabilities. For example, hashes are verified by checksums. One bug that Microsoft announced on Nov. 18, 2014 is a checksum vulnerability, designated as CVE-2014-6324. The checksum function in Microsoft's Kerberos implementation was allowing false positive password hashes to authenticate users because Active Directory was treating incorrect passwords as if they were correct. That left the door open for privilege escalation attacks, because Kerberos authentication in all versions of Windows was not functioning properly. CVE Details, a vulnerability reporting service, reported a total of 107 known vulnerabilities since 1999, the year it began counting, with 47 of those vulnerabilities being reported since 2010. In 2015 alone, there were 6 vulnerabilities reported with CVSS scores (common vulnerability scoring system) greater than 5.0. This data suggests both the incidence rate and severity of Kerberos-based authentication system vulnerabilities are on the rise.

The present disclosure teaches a novel system and method to facilitate secure file sharing and storage over dispersed communication networks. It further teaches systems and methods of creating standalone and Kerberos-based network authentication methodologies which are applicable to all forms of terrestrial and cloud-based communication networks.

BRIEF DESCRIPTION OF THE FIGURES

FIG. 5b is a computer screen shot of four virtual applications concurrently dispersing a batch of original files.

DETAILED DESCRIPTION OF SEVERAL EMBODIMENTS

Figure 1A:
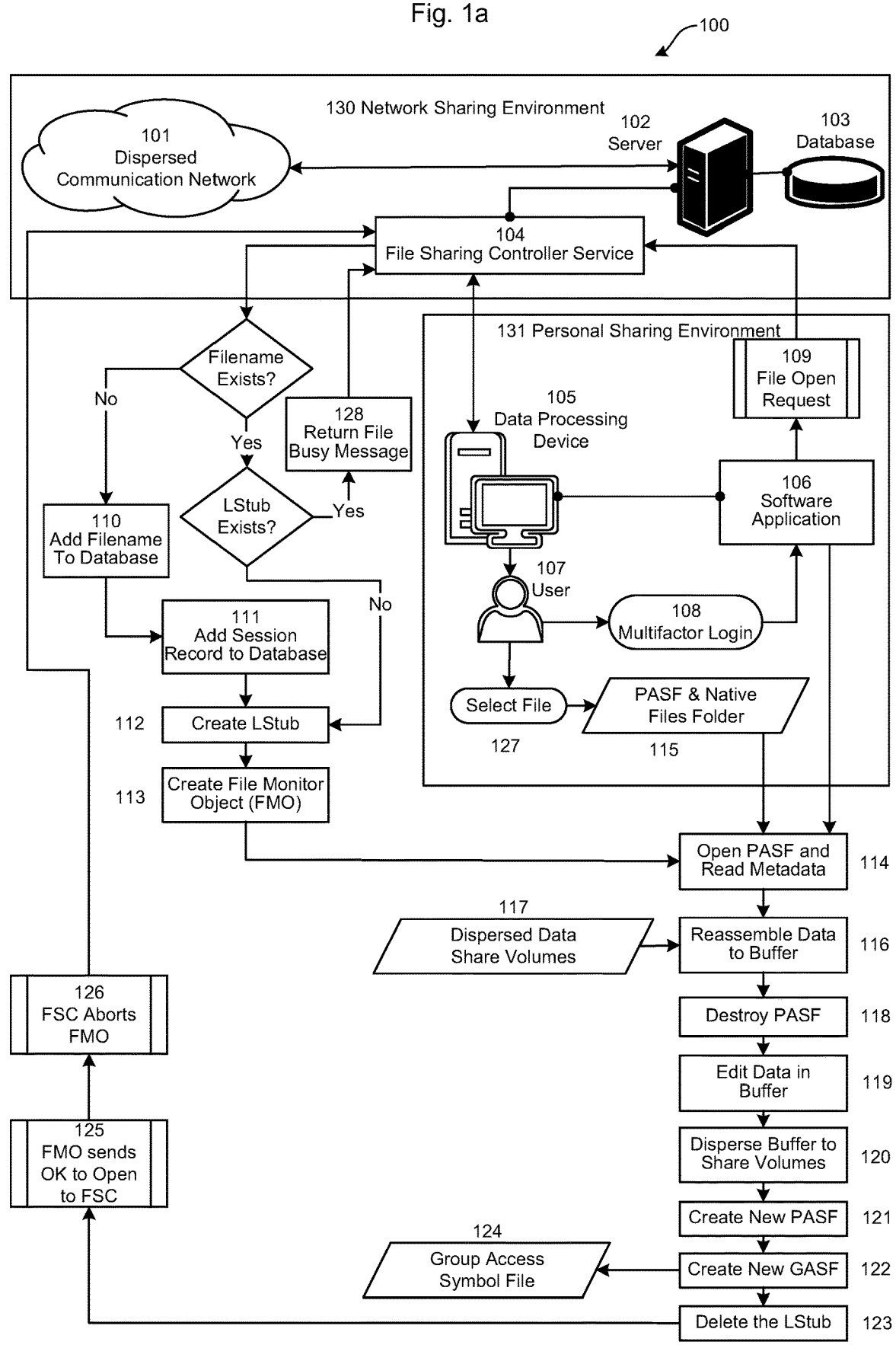
FIG. 1a is a schematic representation of a system 100 for securely transmitting and storing shared information in a dispersed communication network according to a disclosed embodiment.

The terms "dispersed communication network" and "DCN" as used interchangeably herein refer to any form of network that facilitates electronic transmission and storage of digital information that has been processed by an information dispersal algorithm for transfer, storage, and processing by computing devices.

The terms "virtual dispersed communication network" and "VDCN" as used interchangeably herein refer to any form of virtual network that facilitates electronic transmission and storage of digital information that has been processed by an information dispersal algorithm for transfer, storage, and processing by computing devices.

In general, this disclosure is directed to systems and methods for securely sharing digital information over dispersed communication networks. Digital information may include information transmitted across any DCN. Dispersed communication networks may include, for example, data networks such as a LAN (Local Area Network), MAN (Metropolitan Area Network), WAN (Wide Area Network), PAN (Personal Area Network), cellular networks, power line networks; satellite link networks, or any combination thereof. Furthermore, the transmission medium for such networks may be wired or wireless. The information itself may represent voice information, data information, multimedia information, or any other such information capable of being transmitted across a DCN. As discussed below, the present disclosure may be implemented as a software program running on a processor, a hardware device, or any combination thereof.

At a high level, this disclosure is directed to at least one software program running on one or more computing devices. The software program implements at least one algorithm that provides an end-to-end information storage and transmission solution which facilitates secure file sharing between multiple authorized users of the DCN regardless of the security domain. This is possible because data does not need to be protected by conventional security domains and access controls. Since the data exists as incomplete dispersed subsets of data primitives, it substantially protects itself.

The disclosure may be implemented in software running on a processor, other hardware or both. In an embodiment, the implementation may include software embodying an algorithm consistent with the present disclosure. Furthermore, the algorithm may be configured to function on all types of wired networks using different transmission media such as, for example, coaxial cable, fiber optic cable, powerlines, and all types of wireless networks operating at different frequencies based on the type of transmission standards used. In addition to being transmission medium agnostic as discussed above, the algorithm is also communication protocol agnostic, meaning that it can be implemented on a dispersed communication network using any communication protocol or standard such as, for example, IP, DecNet AppleTalk, Ethernet on a data network, GSM or CDMA on a cellular network, or any other such protocol or standard.

Secure File Sharing

The terms "information" or "data" as used interchangeably herein refer to any form of digital information construct that can be transmitted and stored on a dispersed communication network (DCN).

The term "service" as used herein refers to any form of computer program that operates in the background such as, but not limited to, a Windows service or an operating system daemon, such as a Unix daemon.

The term "module" as used herein refers to any form of software which is a part of a program.

The term "program" as used herein refers to any form of software that is composed of one or more independently developed modules which are not combined until the program is linked. A single module may comprise one or more routines, i.e. a sequence of computer instructions for performing a particular task.

The terms "file sharing controller" and "FSC" as used interchangeably herein refer to any form of software or hardware that may interact with, or cause interaction between, the DCN, the App, and/or the user.

The terms "software application" and "App" as used interchangeably herein refer to any form of software that may interact with, or cause interaction between, users and the FSC service. The App may be an installed program, an uninstalled program, or a virtual machine functioning as a program.

The terms "user" or "users" as used interchangeably herein refer to any person or group of people, or any computer or automation device, which may interact with a file sharing computing device of the disclosure.

The term "metadata" as used herein refers to data that summarizes basic information about data, which can make finding and working with particular instances of data easier.

The terms "information dispersal algorithm" and "IDA" as used herein refer to any form of mathematical formula or algorithm using software or hardware or both which implements information dispersion. Examples of IDAs are provided in an article by Michael O. Rabin in the Journal of the ACM, April 1989, entitled "Efficient Dispersal of Information for Security, Load Balancing, and Fault Tolerance," the contents of which are incorporated herein by reference in their entirety. Additional examples of IDAs are provided in an article by Philippe Beguin and Antonella Cresti in the journal Theoretical Computer Science, March 1999, entitled "General Information Dispersal Algorithms," the contents of which are incorporated herein by reference in their entirety.

The terms "native file" and "native data" as used interchangeably herein refer to any form of original computer information file such as, for example, an Adobe Acrobat file (.pdf), a spreadsheet, such as a Microsoft Excel spreadsheet (.xlsx), a word processing document, such as an Apple Pages document (.pages), including audio and/or video files, Magnetic Resonance Imaging (MRI) files, Geographic Information System (GIS) files, and the like that exists anywhere and in any original form in a computing system network as intact complete discernible information.

The term "dispersed native file" as used herein refers to any native file or native data, which was processed by an IDA into a digital data dispersion that comprises a system consisting of the dispersed data substance and the communication network medium in which it is dispersed.

The term "reassembled native file" as used herein refers to any dispersed native file, which has been reversibly processed by an IDA into native data that is substantially identical to the native file or data from which it was originally dispersed.

The term "share volume" as used herein refers to any form of digital file that comprises partial information which may be generated by converting a native file into a dispersed native file.

The term "stub file" as used herein refers to any form of computer file that appears to the user to be stored and be immediately available for use, but is actually held either in part or entirely on a different storage medium. A stub file may also include metadata, instructions, directives, or procedures and the like which may be used by the App to reassemble a dispersed native file from information that may reside in share volumes and/or other data sources.

The terms "token" and "token file" as used interchangeably herein refer to any form of digital file that may include metadata, instructions, directives, or procedures and the like that may be used by the software application to reassembly: a dispersed native file from information which may reside in share volumes and/or other data sources.

The terms "access symbol file" and "ASF" as used interchangeably herein refer to a digital file which may comprise, for example, metadata, instructions, directives, and/or procedures used by the App.

ASF files are reassembly maps used by the App to reassemble the data contained in share volumes into reassembled native files that are identical to the original file in every respect. Reassembly maps are digital files, such as for example a stub file or token file. Additionally, a reassembly map may be a share volume file, share file, shard file, or the like which includes a reassembly map as well as disassembled data.

The terms "PASF" and "GASF" as used herein refer to personal ASF and group ASF. Both are flavors of ASF files that were constructed using personal or group DNA.

The term "DNA" as used herein refers to a set of encryption key components which may be employed to create a personal ("Personal DNA") access symbol file or a group ("Group DNA") access symbol file. Using Personal DNA to generate encryption keys to encrypt personal data and Group DNA to generate encryption keys to encrypt group data ensures that users and administrators do not have direct access to native data.

The terms "lock stub file" or "LStub" as used interchangeably herein refers to a digital file which may contain metadata or a pointer to metadata which may be used as an assembly map residing on the DCN to regulate the locking and unlocking of files.

The term "agent" as used herein refers to a means or instrument by which a guiding logic achieves a result.

FIG. 1*a* provides a flow chart representation of a dispersed communication network system 100 for securely sharing information according to a disclosed embodiment. System 100 includes a network sharing environment 130, and at least one personal sharing environment 131. The network sharing environment includes a dispersed communication network 101, at least one server 102 which is connected to at least one database 103, and a file sharing controller service 104. The personal sharing environment 131 includes a data processing device 105 for inputting and outputting information to users 107, a software application 106, which may contain at least one module comprising one or more routines that facilitate secure sharing of data between users and devices, a multifactor login module 108, and at least one folder containing personal access symbol files PASF 115.

In an embodiment of the present disclosure, a user selects a file 127 by clicking a button of the user interface ("UI", not shown) of the App 106 that launches a file selection dialog object (not shown). Since the App is hosted on a DCN 101, only a native file or PASF can be selected from the PASF and native file activated folder 115. If the user selects a native file, the file is dispersed into a number of share volumes in a manner consistent with the present disclosure. This constitutes the basal state of information residing in the dispersed network. Typically, a user selects a PASF bearing the filename of a dispersed native file to open. The user may or may not know the PASF is not a native file. The App sends a File Open Request 109 to the file sharing controller 104. The file open request may contain data the controller needs such as, for example, the event, the username, user authentication data, and other information.

The FSC 104 queries the database 103 to determine if the filename exists in the Files table. If it does not exist, the FSC adds the filename to the Files table 110, which allows the user to have read/write privileges. If the filename does exist in the database 103, the FSC queries the network to see if an LStub 112 for that filename exists. If the LStub does exist, a file busy message 128 is returned to the FSC. The user requesting the file may be notified the file is in use and, optionally, the user may be allowed to open the file in read-only mode. As such, the user may be able to edit the file, but would not be allowed to successfully save it until the user with write privileges releases the file.

If the filename did not exist in the Files table, the FSC may add a Session record to the Session table 111. If the filename did not exist in the database 103 or the LStub did not exist, the FSC creates an LStub 112 for that filename and creates a file monitor object FMO 113. The LStub serves as a file sharing agent that replaces the PASF 115, which monitors the open/closed status of the dispersed native file. This is necessary because PASF 115 will be destroyed when the dispersed native file is reassembled into a reassembled native file in memory buffer 116 from share volumes stored in the dispersed data share volumes folder 117.

The file is now ready to be opened. App 106 opens the PASF and reads the metadata 114. That information is used to reassemble the file 116 from dispersed data share volumes 117. After the dispersed native file is reassembled, its PASF may be destroyed 118. The user is then free to examine or edit the information in the data buffer 119, and, if the user has write privileges, save/disperse the data to share volumes 120. This action may create a new PASF 121 and optionally a new GASF 122. The PASF is stored in the user's PASF and native file folder 115 and the GASF is stored in the group access symbol file folder 124. Next the App 106 deletes the LStub 123, which will be detected by its FMO 113, whereupon the FMO will send an "okay to open" message to the FSC 125. When the FSC receives the "okay to open" message, it may abort the FMO thread and close the Session record 126. The file is then ready to be opened again by the next user file open request 109.

Because these actions are occurring in a dispersed network, instead of a conventional network, actual intact native files may never be present on a storage device from the moment of creation to the end of their lifecycle. Consequently, performing secure file sharing in a dispersed network such as, for example, DCN 101, is problematic. For instance, when a user reassembles a dispersed native file, that user's access PASF may be destroyed. For a non-networked single user computing system, destroying the PASF would prevent other users from reassembling additional native files, since GASF files would probably not be created. There would be no need for them. GASF files are needed in a shared dispersed network to make dispersed native files accessible to all users, or optionally to groups and subgroups of all users. When a dispersed native file is reassembled in a dispersed network the corresponding GASF is not destroyed. Therefore, a plurality of users could reassemble multiple concurrent clones of the native file. This would be chaotic unless the file sharing system functioned like a database that could globally commit all the modifications generated by a plurality of users in their proper order and sequence. This would necessitate creating a database-style file modification authority with the capacity to regulate transactions of all file types for a multitude of globally distributed users. While not impossible to achieve in theory, in practice it would be extremely expensive to build and maintain, and would almost certainly be substantially more expensive to build and operate than the present embodiment. Conversely, a version of the present embodiment may be used in conjunction with an existing file sharing system such as, for example, Microsoft SharePoint. SharePoint is an extremely flexible file sharing system, but it is weak with respect to maintaining data security, and persistence. The techniques employed by the present embodiment can be used in concert with SharePoint's data input/output functionality to extend and enhance SharePoint's data security and persistence.

The present embodiment does not function like SharePoint. Instead it shares a file similar to how a public lending library shares a book, only in this instance the present embodiment is sharing the vehicle for accessing information, not the information itself. If a user has authenticated access to the DCN, that user can check out a file. The major difference between a public library and the DCN is the files of the DCN are all maintained in a dispersed state as data share volumes which are stored in a plurality of globally or spatially separated locations. Consequently, share volumes must be reassembled into native files to be discernible. An unlimited number of users can have read-only access to a specific file, but only one user can have write access privileges to said specific file.

The system and methods of the present disclosure enforce, regulate, and facilitate secure, persistent, orderly file sharing over a variety of dispersed network topologies and network security domains by dividing the total number of users into user trust groups. A user trust group is created by constructing a virtual private cloud, or by employing a group encryption key, or by creating a VLAN or subnet or the like, or by any combination thereof. Users of a user trust group such as, for example Group A users, may share information with other Group A users. Trust Group A may further be subdivided into "reading rooms" wherein specific users of Group A may be members of and/or restricted to one or more subgroups such as, for example, Group A-1 and/or Group A-2. Reading rooms may be protected by creating group encryption keys, or by creating VLANs, or subnets, and the like, or by any combination thereof. Additionally, Group A users may share information with, for example, Group B users by securely exchanging group encryption keys between specific users by means of, for example, a Diffie-Hellman key exchange algorithm, or PKI key pair, word-of-mouth exchange, or any other means of secure key exchange.

One skilled in the art will appreciate that these techniques may be combined in such a manner that secure information sharing could be restricted to as few as two users of a single trust group, or to any number of trust group users over any number of trust groups of any network topologies and any number of security domains.

The LStub may adopt the filename of the file selected by the user or any other filename, plus it may append the LStub filename with a file type such as, for example, ".stb" or ".map" or any other file type. In addition, the FSC creates at least one file monitor object ("FMO") 113 to monitor the status of the LStub file. The FMO may run on a separate thread of the FSC, or it may be launched from a separate computing process, or any combination thereof. The function of the FMO is to periodically query the DCN to determine if the LStub exists on the network.

With the FMO and LStub operating on the DCN, the App may open the requested PASF and read its contents 114. Then the App may open the GASF and read elements of its metadata comprising all or part of a reassembly map needed to reassemble the dispersed native file's share volumes into a reassembled native file. In order to maintain a high level of user isolation from data, the PASF files of a specific user may only be stored in that user's personal folders such as, for example, the user's assigned network domain folder.

Folders that store GASF files may be created in DCN storage spaces which are invisible and inaccessible to all users. Information regarding the locations of GASF files may be stored as metadata in the requested PASF, as metadata in the requested GASF, or in a local or remote network storage location 181 (See FIG. 1b), or in a cloud-based storage location (not shown), or any combination thereof. In addition, said storage location may be one or more databases (not shown).

With the FMO and LStub operating on the DCN, the App may read the minimum number of share volumes 117 and reassemble the data included in the minimum number of share volumes into a reassembled native file held in memory buffer 116. The data in said memory buffer may then be read and edited, or otherwise modified 119. After that, the native file data in said memory buffer may be dispersed into share volumes 120. While the reading and editing processes are in progress, the FMO continues to query the DCN to determine if the LStub still exists. When the user is finished using the data in the buffer, and closes the reassembled native file, the App disperses the data 120 into new share volumes 117. In addition, the App creates a new PASF 121 if it was destroyed and optionally creates a new GASF 124 if its metadata was changed by the editing and/or modifying processes. The App then deletes the LStub 123.

When the FMO 125 queries the LStub status and receives a negative value, the FMO sends the FSC an "OK to Open" message 125, whereupon the FSC aborts the FMO 126, updates the database File record to show the GASF is closed, closes the Session record, and logs the session data for reporting. The GASF file is now ready to be opened again.

The FMO may query the DCN based upon process initiating events, or process triggers, or by time intervals, or by external events, or by any other event or combination of events controlled by the FSC which may cause the FMO to query the network.

By practicing techniques consistent with the present disclosure, files may be securely shared across multiple security domains and dispersed communication networks.

Figure 1B:
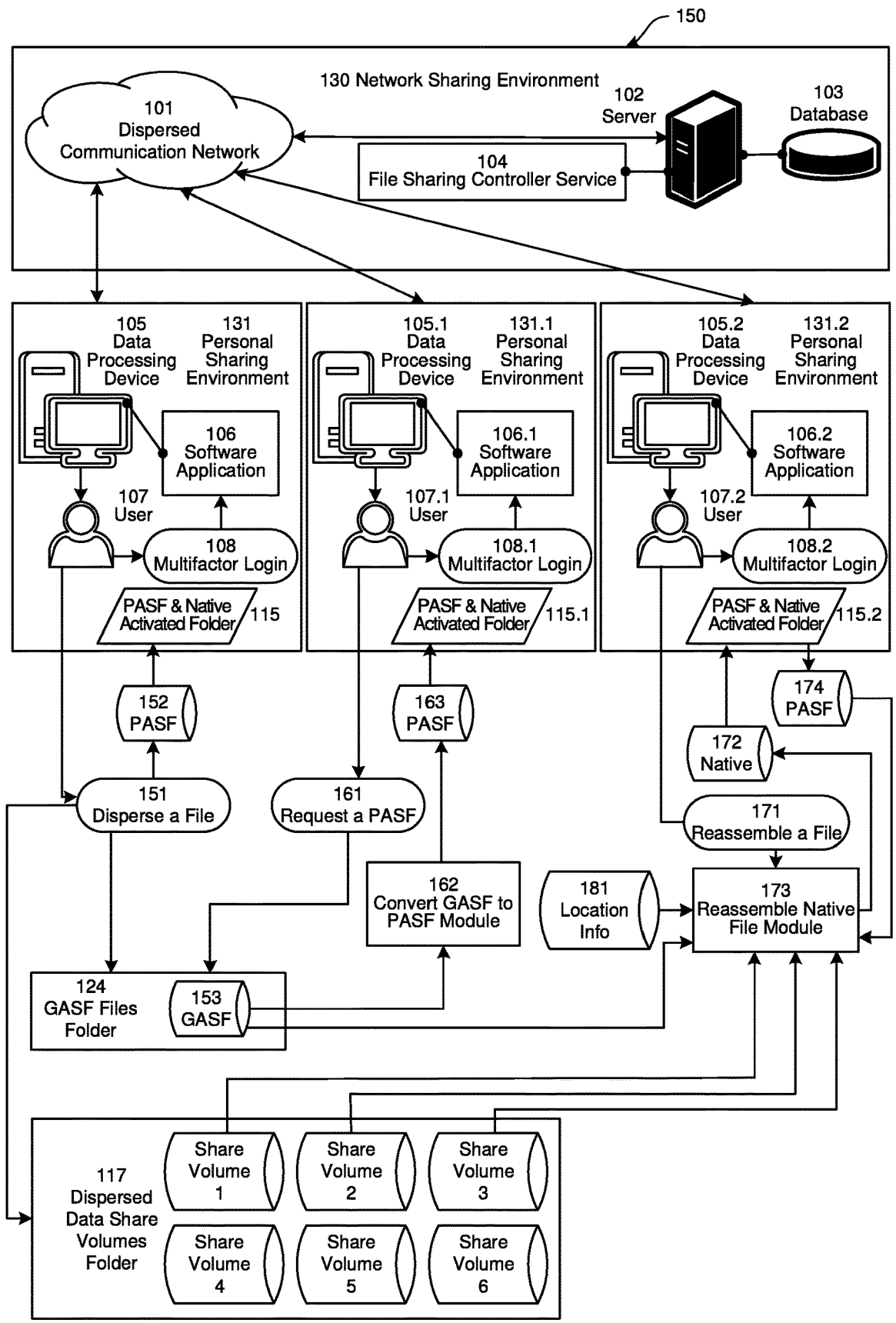
FIG. 1b is a schematic representation of a system 150 for securely transmitting and storing shared information in a dispersed communication network according to a disclosed embodiment.

FIG. 1b provides a flow chart representation of a dispersed communication network system 150 for securely sharing information according to a disclosed embodiment. Further it depicts the three principal actions for securely sharing files according to the present disclosure: dispersing native files in personal sharing environment 131, requesting access to dispersed information in personal sharing environment 131.1, and reassembling dispersed information to reassembled native files in a personal sharing environment 131.2. System 150 includes a dispersed network sharing environment 130, of system 100, and at least one personal sharing environment 131 of system 100. The network sharing environment includes a dispersed communication network 101 of system 100, at least one server 102 of system 100, at least one database 103 of system 100, and at least one file sharing controller service 104 of system 100. Each personal sharing environment 131, 131.1, 131.2 includes a data processing device 105 of system 100 or 105.1, 105.2 for inputting and outputting information to users 107 of system 100 or 107.1, 107.2, a software application 106 of system 100, which may contain at least one module comprising one or more routines that facilitate secure sharing of data between users and devices, plus an information dispersal module for dispersing and reassembling information, a multifactor login module 108 of system 100 or 108.1, 108.2, and at least one folder containing personal access symbol files PASF 115 of system 100. System 150 may also include a plurality of additional personal sharing environments for other users.

Typically, when a user creates or receives a native file, it is sent to the PASF and native file activated folder 115, whereupon the user disperses the native file 151 in a manner consistent with the present disclosure. Preferably, if said folder is activated by, for example, a kernel activation driver, or a software process such as, for example, FileSystemWatcher (not shown), the native file will automatically be dispersed without a user initiating the action. This automatic initiation occurs when the kernel activation driver or FileSystemWatcher detects the native file write process and intervenes, causing the native file to be dispersed and written to the user's data processing memory such as, for example, random access memory (RAM), instead of being written to a memory device such as, for example, a hard drive. Thus a native file processed according to this embodiment would never be stored on a long-term memory device in its native form and as such would never become a discernible residual image on a hard drive.

Figure 2:
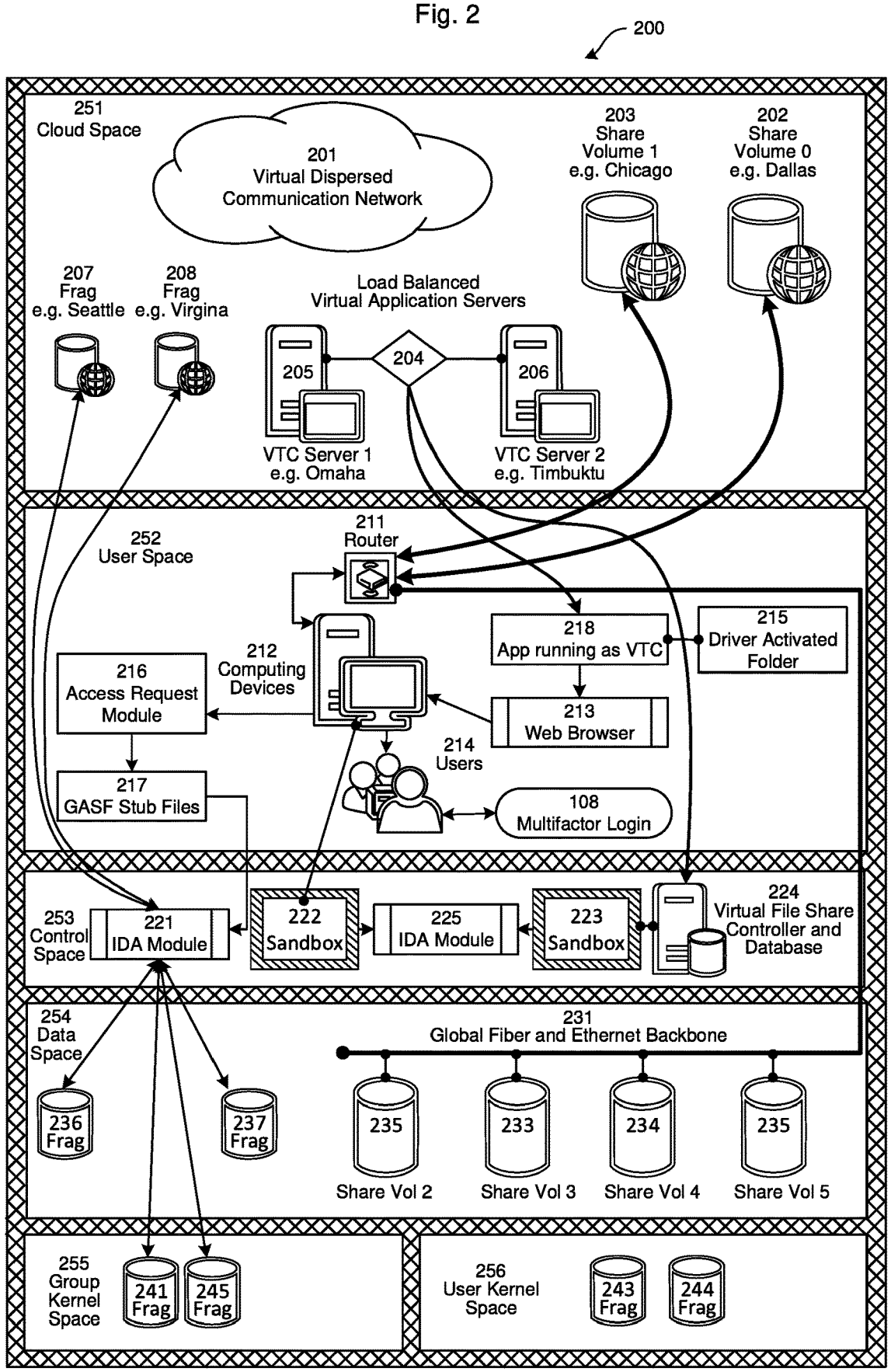
FIG. 2 is a schematic representation of a system 200 for creating and operating a virtual dispersed communication network for securely transmitting and storing shared information using software that is deployed over the Internet as virtual machines according to a disclosed embodiment.

Alternatively, when a user saves or drops a native file into activated folder 215, it may be rapidly moved to a hidden folder in the user kernel space 256 (see FIG. 2). A small pointer file may replace the native file in activated folder 215. The pointer file may bear the same filename as the native file or some other designation. Double clicking the pointer file may cause the native file to open in the software with which it is associated. Moving the native file to the user kernel space and dispersing, reassembling, and opening the native file in the user kernel space, or folder accessible by or from the kernel space, in a manner consistent with the present disclosure, provides substantially higher security than performing the same processes in the activated folder, which is in the user space, accessible to users, administrators, and potentially hackers. Furthermore, the kernel driver, or agent, or module of the App, or any combination thereof may enforce a restriction whereby a native file could never exist as intact discernable information except in the memory of an authenticated user's computing device. At all other times, from the moment of creation to the end of its lifecycle, a native file could only exist as a globally distributed dispersion of data primitives.

One skilled in the art will appreciate that by using a kernel driver to provide enhanced functionality to activated folder 215, the pointer filename, metadata, and attributes could be set to the same values as those of the native file, thereby obfuscating the appearance of the pointer file and rendering the process of protecting the native file transparent to users.

Additionally, this has the added benefit of enhancing the user experience since the native file would appear to be processed almost instantly rather than waiting for the native file to be dispersed in the activated folder. The dispersal process could run unseen in the background on, for example, a background thread, external process, services, or daemon, or the like, while the user performs other actions in the foreground. If a user wanted to open the native file before it was entirely dispersed, that would not pose a problem since the native file should remain intact until the dispersal process is completed and validated. The intact native file may be opened before the dispersal process begins or once it has begun. If so, the dispersal process may be prevented or halted until the user closes the file, whereby the dispersal process may automatically begin again or resume from where it left off.

File sharing for a dispersed native file is achieved as a result of the App generating a PASF 152 which is encrypted, for example, with the user's Personal DNA. The process of dispersion typically destroys the native file and the personal PASF replaces the native file in the PASF and native file activated folder. In addition, the App generates a GASF 153 which is encrypted using, for example, group DNA. The GASF is sent to the GASF files folder 124 of system 100 that is accessible to users of the trust group where the GASF is stored. The App also generates a number of data share volumes that may be stored in the dispersed data share volume folder 117 of system 100 that is accessible to users of the trust group where the GASF files are stored.

If a user (requestor) such as, for example user 107.1, wants to access to a shared file, the requestor may request a PASF 161 to cause App 106.1 to convert a GASF such as, for example, GASF 153 of the requested dispersed native file to convert the GASF's metadata 162 to the requestor's PASF metadata and store the newly created PASF 163 in the PASF and native file activated folder 115.1. The requestor may then access the PASF 163 which will cause the requested dispersed native file to be reassembled. Consequently, a one-to-one access relationship is maintained between each user and each dispersed native file without the user having access to the reassembled native file once it has been dispersed. This one-to-one relationship, combined with the access safeguards imposed by multifactor login and authentication 108, of system 100, means a user can give another user a PASF and the other user would not be able to access the dispersed native file. Further it means a network administrator could give a user or another administrator a GASF and the receiving user or another administrator, including the giving administrator, would not be able to access the dispersed native file. Only an authenticated disperser or authenticated requestor of a dispersed native file can gain access because the authenticated disperser or authenticated requestor's Personal DNA is integral to the creation of a PASF and a valid PASF is integral to the process of access as a result of the novel techniques of this disclosure.

Typically, if a user such as, for example, user 107.2 wants to access a file such as for example, "Sample.txt," which is shared in a manner consistent with the present disclosure, the user must request a PASF for Sample.txt. Having received the PASF 174, which, for example, may be named "Sample.txt.map," the user may request the App 106.2 to reassemble the dispersed native file 171. This action causes the App to activate the reassembly module 173, of App 106.2, to open PASF Sample.txt.map 174 and read its personal metadata. In addition, the App opens GASF 153, of system 100, and reads its group metadata. The reassembly module then extracts elements of metadata which may be included in the group metadata, and/or the personal metadata, and/or the network location information 181, plus information which may be hard coded into the App or contained in its supporting files or software utilities, to build an ephemeral single-use symbol map comprising all of the information needed to open and read into memory a minimum number of share volumes 117, of system 100. Then the reassembly module may reassemble the minimum number of share volumes, in a manner consistent with the present disclosure, into a reassembled native file 172 which is substantially identical in every respect to the native file Sample.txt. The reassembled native file is then sent to the PASF and native activated file folder 115.2. However, the reassembled native file may not be saved to a memory device such as, for example, a hard drive or USB flash drive. Instead the kernel activation driver may cause the reassembled native file to be directly saved as a memory buffer in the App's memory such as, for example, RAM, whereby it could be viewed and optionally modified by the native file's associated software application.

Figure 1C:
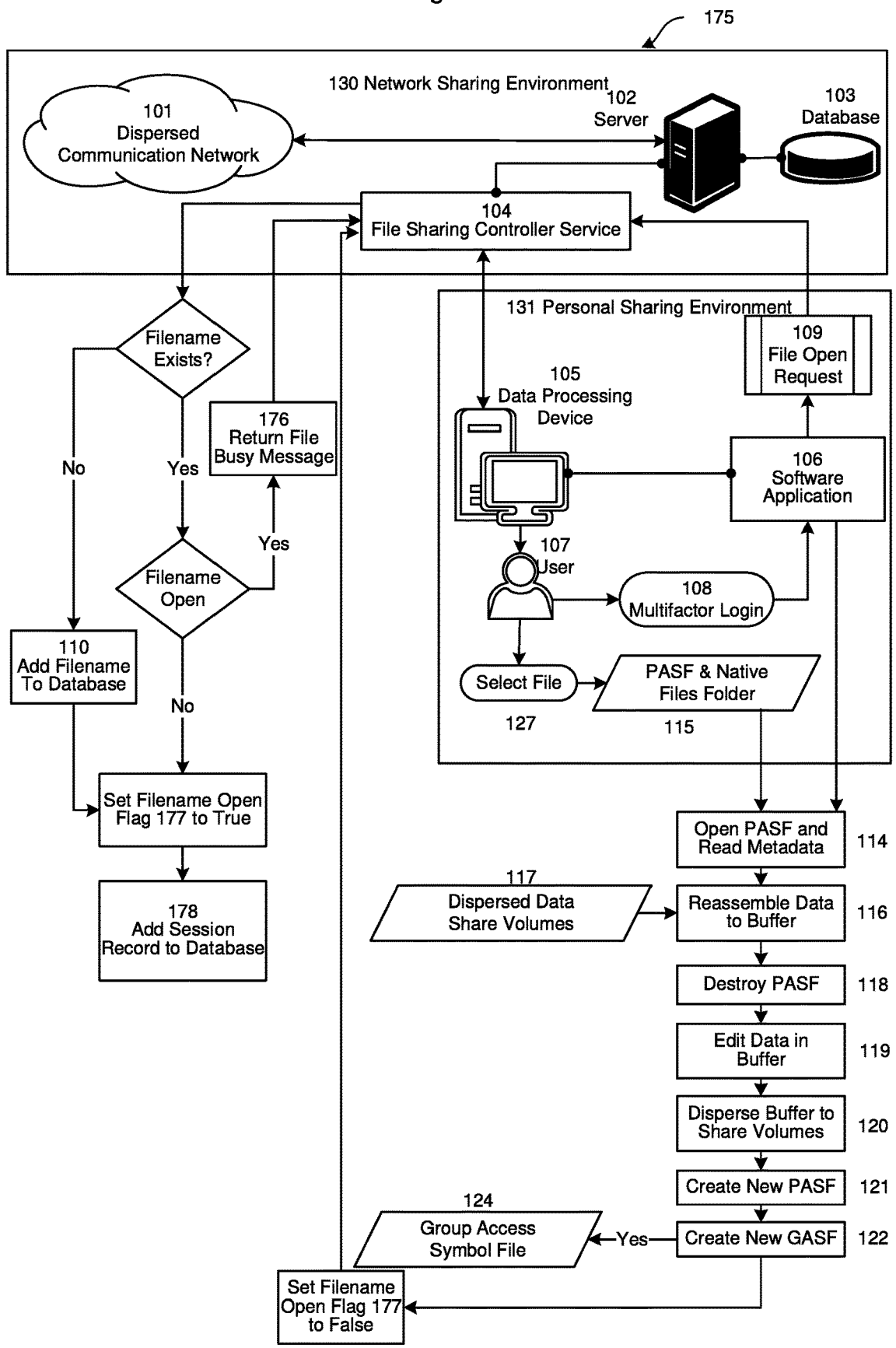
FIG. 1c is a schematic representation of a system 175 for securely transmitting and storing shared information in a dispersed communication network according to a disclosed embodiment.

FIG. 1c provides a flow chart representation of an alternative dispersed communication network system 175 for securely sharing information according to a disclosed embodiment. System 175 includes a network sharing environment 130, and at least one personal sharing environment 131. The network sharing environment 131 includes a dispersed communication network 101, at least one server 102 which is connected to at least one database 103, and a file sharing controller service 104. The personal sharing environment includes a data processing device 105 for inputting and outputting information to users 107, a software application 106, which may contain at least one module comprising one or more routines that facilitate secure sharing of data between users and devices, a multifactor login module 108, and at least one folder containing personal access symbol files PASF 115.

In an embodiment of the present disclosure, a user selects 127 a file by clicking a button of the user interface ("UI", not shown) of the App 106 which launches a file selection dialog object (not shown). Since the App is hosted on a DCN 101, only a native file or PASF can be selected from the PASF and native file activated folder 115. If the user selects a native file, the file is dispersed into a number of share volumes in a manner consistent with the present disclosure. This constitutes the basal state of information residing in a dispersed network. Typically, a user selects a PASF bearing the filename of a dispersed native file to open. The user may or may not know the PASF is not a native file. The App sends a File Open Request 109 to the file sharing controller 104. The file open request may contain data the controller needs such as, for example, the event, the username, user authentication data and other information.

The FSC 104 queries the database 103 to determine if the filename exists in the Files table. If it does not exist, the FSC adds the filename to the Files table 110, which allows the user to have read/write privileges. If the filename does exist in the database 103 the FSC 104 determines whether the filename is open. If the filename is open, a file busy message 176 is returned to the FSC. The user requesting the file may be notified the file is in use and, optionally, the user may be allowed to open the file in read-only mode. As such, the user may be able to edit the file, but would not be allowed to successfully save it until the user with write privileges releases the file. If the filename is not open or has been added to the database, the FSC sets the open Flag 177 to True and adds a session record to the database 178. The user can then continue to open the PASF and read the metadata 114 and reassemble the dispersed native file data to buffer 116. After the dispersed native file is reassembled its PASF may be destroyed 118. The user is then free to examine or edit the information in the data buffer 119, and save and disperse the data to share volumes 120. This action may create and new PASF 121 and a new GASF 122. The PASF is stored in the user's PASF and native file folder 115 and the GASF is stored in the group access symbol file folder 124. Next the App 106 sends a message to the FSC to set the Flag to False. When the FSC receives the message it sets the Flag 177 to false, and file is ready to be opened again by the next user file open request 109.

One skilled in the art will appreciate that by practicing the techniques of the present disclosure, native data may be securely shared and protected against unauthorized access and loss from the moment of its creation to the end of its lifecycle since native files, once dispersed in a manner consistent with the present disclosure, may never exist as intact complete discernible information outside of the volatile memory of a single data processing device.

Virtual Dispersed Cryptographic Communication Network

The term "kernel" as used herein refers to a program that constitutes the central core of a computer operating system. It is not a process, but rather a controller of processes, and it has complete control over everything that occurs on the system. This includes managing individual user processes within user space and preventing them from interfering with each other.

The terms "kernel driver" and "driver" as used interchangeably herein refer to code that runs in the kernel mode rather than user mode. Kernel mode modules are written to implement device drivers that operate or control a particular type of device attached to a computer. Drivers provide a software interface to hardware devices, enabling operating systems and other computer programs to access hardware functions without needing to know precise details of the hardware being used.

The term "process" as used herein refers to an executing (i.e., running) instance of a program. User processes are instances of all programs other than the kernel (i.e., utilities and application programs). When a program is to be run, it is copied from storage into the user space so it can be accessed at high speed by the central processing unit (CPU).

The term "user space" as used herein refers to that portion of system memory in which user processes run. A modern computer operating system generally segregates virtual memory into kernel space and user space.

The term "kernel space" as used herein refers to that portion of system memory in which the operating system kernel executes and provides its services.

The term "sandbox" as used herein refers to a security mechanism for separating running programs. It is often used to execute untested code or untrusted programs from unverified third parties, suppliers, untrusted users and untrusted websites. In the sense of providing a highly controlled environment, sandboxes may be seen as a specific example of virtualization.

The term "key primitive" as used herein refers to the product of an encryption algorithm that converts at least one data element into at least one second data element that may be used, for example, to seed an encryption key generator which produces, for example, at least one single-use ephemeral encryption key.

FIG. 2 provides a schematic representation of a system 200 for designing, building and operating a virtual dispersed communication network ("VDCN") for securely transmitting and storing digital information using at least one kernel driver (not shown) and at least one virtual machine running as a virtual thin client ("VTC") 218, according to a disclosed embodiment. System 200 divides the VDCN into six spaces. They are the cloud space 251, user space 252, control space 253, data space 254, group kernel space 255, and user kernel space 256.

The cloud space 251 typically includes at least one virtual dispersed communication network 201, one or more cloud-based datacenters for storing share volumes 202 and 203, one or more virtual thin client application servers 205 and 206, and optionally a load balancer 204. VTC server 205 or 206 may serve a virtualized version of App 106 of system 100, which has been converted to a virtual machine according to an embodiment of this disclosure. Furthermore, the cloud space may be used to store dispersed fragments 207 and 208 of access symbol files (ASF) 115 of system 100 which were created by IDA module 221.

The user space 252 typically includes a router 211, one or more computing devices 212 capable of hosting a web browser 213, a multifactor login module 108 of system 100, one or more users 214 of the computing devices, at least one driver activated folder user interface 215, and a file sharing access request module 216. The VTC 218 may be running by means of a web browser 213 add-in, running in a sandbox such as, for example, sandbox 222.

The control space 253 typically includes at least one virtual file share controller service ("VFSC") and at least one virtual database ("VDB") 224. The VFSC is the FSC 104 of system 100 and the VDB is the database 103 of system 100 that have been converted to virtual machines according to an embodiment of this disclosure. The control space may also include one or more sandboxes for running and protecting virtual thin clients ("VTC"). The VFSC and VDB may be running in, for example, sandbox 223. The VTC is the App 106 of system 100 that has been converted to a virtual machine according to an embodiment of this disclosure. Additionally, the control space may include an information dispersal algorithm (IDA) module 221 for disassembling access symbol file (ASF) 115 of system 100.

The data space 254 typically includes at least one fiber or Ethernet backbone or both for transmitting digital information 231 and a plurality of storage locations for storing dispersed share volumes 232, 233, 234 and 235. The storage locations may be local or they may be geographically separated locations such as for example datacenters located in different cities or countries. In addition, the data space may include one of more storage locations for storing ASF fragments 236 and 237 which were dispersed with an IDA module 221.

The division of system memory into user space and kernel space plays an important role in maintaining system stability and security. Typically, the group kernel space 255 of the present embodiment is the physical or virtual memory of the FSC 104, of system 100, or physical or virtual memory of the VFSC 224. The group kernel space 255 may include storage of fragments 241 and 242 of sandbox 222 which were generated by IDA module 225 in a manner consistent with the present embodiment. The group kernel space 255 may also be used to temporarily store cached files of any sort. Furthermore, it may be used to store or sequester authentication credentials, encryption keys and key primitives, or any other information that needs to be hidden beyond the reach of users and administrators.

Typically the user kernel space 256 may include local storage of ASF fragments 243 and 244, as well as fragments (not shown) of sandbox 223 which were generated by IDA module 225 in a manner consistent with the present embodiment. The user kernel space may also be used to temporarily store cached files of any sort. Furthermore, it may be used to store or sequester authentication credentials, encryption keys and key primitives, or other any information that needs to be hidden beyond the reach of users and administrators.

Users need not have knowledge of, expertise in, or control over the technology infrastructure that supports them. The technology infrastructure may further incorporate infrastructure as a service (IaaS), platform as a service (PaaS), and software as a service (SaaS), as well as other technology that have the common theme of reliance on the Internet for satisfying the computing needs of the users. Cloud computing services may provide online access to users from a web browser, while software and data are stored on local, remote, or cloud servers. In an embodiment consistent with the present disclosure, the term cloud may be used as a metaphor for the Internet, based on how the Internet is depicted in computer network diagrams, and is an abstraction for the complex infrastructure it conceals.

Typically, users of a dispersed communication network or a virtual dispersed communication network may be locally or globally distributed, or both, and they may be on or off the cloud. Remote users may not use conventional workstations and laptops because most data processing functions that users need may be provided by systems in the cloud. To this end, a remote user's data processing system can be any device that links by any means, whether actual or virtual, to a cloud computing system in such a manner as to facilitate data processing functions between the remote user's data processing system and the cloud system's data processing system. For instance, a remote user may create a VPN connection to data processing system 105, of system 100, or VTC 218, and thereby directly interact with an installed version of an App 106, of system 100 which may be deployed as an installed application that interacts with the FSC 104, of system 100. Alternately, a remote user may interact with App 106, of system 100 that is deployed as a virtual thin client 218 by means of a web browser add-in that supports the deployment of the application to users 215 and 107, of system 100 as a virtual machine delivered over any local network or remote network such as, for example, the Internet in a manner consistent with that of a web page.

Cloud Bonding and Phantom Rekeying

As more and more IT organizations move to the cloud to solve, simplify, and/or economize a variety of data storage requirements, reliance upon service-oriented architectures as a method of multi-cloud governance is becoming more ubiquitous. According to Wikipedia, "a service-oriented architecture (SOA) is a style of software design where services are provided to the other components by application components, through a communication protocol over a network. The basic principles of service oriented architecture are independent of vendors, products and technologies. A service is a discrete unit of functionality that can be accessed remotely and acted upon and updated independently . . . ." Good SOA practices, with respect to availability and persistence of cloud-based data, is to distribute data among multiple cloud providers, instead of putting all the eggs in one basket. That way if, for any reason, data stored with one provider becomes unavailable, a redundant source of data stored with another provider may be accessed. In addition, if the service of one provider is unacceptable for any reason, data stored with that provider may be moved to another cloud with minimal disruption of service.

The wisdom of such practices may be exemplified by the headline "IBM Cloud Storage Provider Files For Bankruptcy" (source Wired, Oct. 2, 2013). In 2013, IBM SmartCloud was widely advertised. IBM used a storage provider called Nirvanix that filed for bankruptcy on Oct. 1, 2013. IBM was forced to give all of its customers two weeks to retrieve their data or it would be lost forever. This caused a multitude of problems for SmartCloud customers including:

1. Loss of Data—for many SmartCloud customers, there was not enough available network bandwidth to retrieve all of their data in allotted time. For some, losses were great;
2. Security Breaches—Data that remained on the abandoned storage devices could not be scrubbed or deleted. This exposed corporate data to any entity that subsequently acquired the abandoned capacity;
3. Operational Disruption—some organizations that depended on SmartCloud data to conduct their cloud-based web services had to declare a disaster;
4. Unexpected Costs—customers that did have enough bandwidth to move a petabyte of data may have paid in excess of $50,000 to move it to another cloud provider such as, for example, Amazon or Google.
5. Compliance Issues—customers that had enough bandwidth to move their data lost all their compliances, requirements that were costly and time consuming to replace.

The term "cloud bonding" as used herein refers to a service-oriented architecture (SOA) implementation that may include software and hardware embodying an algorithm consistent with the present disclosure for bonding and unbonding a wide variety of cloud storage resources to processes and techniques taught by the present disclosure.

Cloud bonding bonds customers to data in a manner that facilitates the relocation of data to alternate storage facilities. Planned and forced displacements of data may be accomplished without physically moving any data. This may be accomplished by employing methods of system 200. For example, if share volumes 202 stored in Dallas and/or share volumes 203 stored in Chicago were lost due to a natural or manmade disaster, or needed to be relocated to another region for whatever purpose, the operation may be accomplished by employing a software agent, consistent with the present disclosure, running as a background worker. The software agent may read, for example, GASF stub file 217 and cause IDA module 221 to assemble the GASF metadata. The GASF may contain at least one metadata file containing the names, or the names and locations, of the total share volumes needed to reassemble at least one native data file. The software agent could know, or be passed, the IP address of at least one native data file's new storage location. If the present location information was included in the GASF file, the software agent may update the GASF file with the new IP address.

Next, the software agent may read the minimum number of share volumes needed to reassemble their native file into a memory buffer, generate an array to receive a maximum number of share volumes, and use an IDA module such as, for example, IDA Module 221, to disperse the reassembled file buffer into the array that was generated to hold the maximum number of share volumes. Then the software agent, if desired, may encrypt only the array member, or members, that were needed to relocate the share volume or volumes. If the IDA was a deterministic IDA all of share volumes would not need to be transmitted to all of the storage locations, since deterministic IDAs always generate identical sets of share volumes for any given dataset they disperse. Consequently, only the missing share volume or share volumes to be moved need to be transmitted. The other share volume array elements can be discarded.

Furthermore, if desired, each share volume may be rekeyed with a different encryption key for the current encryption step. This application alone may be cause enough to periodically or continually relocate data as a means of increasing security.

The software agent would continue working in the background writing each newly reassembled share volume to its new IP address, until all files that need to be relocated were transmitted to their new locations. If this is done in a manner consistent with the present disclosure, up to the minimum number of data storage locations such as, for example a datacenter, could be completely destroyed, or disabled, and relocated without any noticeable degradation or loss of service. Users may be substantially unaware that anything had changed in their computing environment.

The present embodiment offers multiple advantages over conventional wisdom. Foremost among them is data can be relocated by only changing IP addresses and/or moving its metadata. Once that is done, the data itself can simply be abandoned since it comprises only partial information in the form of disassembled data primitives that are not discernible by any means without finding a minimum number of share volumes, possessing the metadata and encryption key or keys needed to facilitate reassembly, and reverse engineering the software used to create the share volumes. Such an accomplishment is generally considered a near-impossibility. If this embodiment was used by IBM SmartCloud the disaster reported by Wired on Oct. 2, 2013 may not have occurred. The extreme outage may have gone unnoticed and it may have had zero impact on customer operations. In addition, abandoned data would remain safe and secure, regardless of the outcome of IBM SmartCloud, and rebuilding data to one or more standby locations would have been transparent and cost far less since a much smaller amount of data would traverse the network. Furthermore, the abandoned data would not generate non-compliance issues since no forensically discernible information was ever written to the abandoned location.

One skilled in the art will appreciate that not only cloud-based data may be safely and efficiently relocated by applying the techniques disclosed herein. These techniques may also be employed to relocated data stored in conventional terrestrial networks, wireless networks, and other such networks.

Controlling User Access to Data

The term "virtual private cloud" and "VPC" as used interchangeably herein refer to a configurable pool of shared computing resources allocated within a public cloud environment, providing a level of isolation between the different users using the resources. The isolation between one VPC user and all other users of the same cloud (other VPC users as well as other public cloud users) is generally achieved through allocation of a Private IP Subnet and a virtual communication construct (such as a VLAN) per user. In a VPC solution, the previously described mechanism, providing isolation within the cloud, is accompanied with a virtual private network function (allocated per VPC user) that secures, by means of authentication and encryption, the remote access to VPC cloud resources.

Cybersecurity experts generally agree that users and administrators pose the greatest threat to data security by intentionally or unintentionally causing sensitive information to fall into the wrong hands. The present embodiment may reduce data security threats by substantially isolating each user from having direct access to any item of native data that does not enter a user's personal driver activated folder 215.

The present embodiment accomplishes this by creating a virtual private network within a public cloud-based network topology. This embodiment divides the VPC into six isolation zones: the cloud space 251, the user space 252, the control space 253, the data space 254, the group kernel space, 255, and the user kernel space 256. Using the techniques disclosed in this embodiment allows enterprise network architects to create a virtual dispersed communication network (VDCN), which by the nature of its topology is a cryptographic communication network that empowers data to protect itself. Each user of the VDCN never comes in direct contact with native data other than that data which may be available in that user's driver activated folder. Once an item of native data is created or dropped into a user's driver activated folder, in a manner consistent with the present disclosure, it never resides as complete intact discernible information from the moment of its creation to the end of its lifecycle in any place outside the memory of an authorized user's data processing device. Other than that it exists as a distribution of dispersed incomplete indiscernible data subsets.

If the system and methods disclosed herein are practiced, users of the VDCN cannot access the incomplete indiscernible data subsets that reside either in the cloud space, the data space, or the kernel space. None of those spaces should ever contain any complete information. A network administrator may have access to the data space, but even if an administrator had unfettered access to the data space there is still no complete information there. Users don't even have that possibility.

By practicing the present embodiment, all a user may access is that user's personal ASF (i.e. "PASF"). When a user creates a file such as, for example, a Pages document or PowerPoint presentation, the user is constrained to only save it to a driver activated folder 215. A kernel driver of the user's computing device 212 intercepts the native file and sends it to IDA module 221 which disassembles the native file into share volumes that are transmitted to the cloud space 251 and/or the data space 254.

After the share volumes 202, 203, 232, 233, 234, and 235 are transmitted and validated, the VTC 218 causes the PASF of system 100 to be created in the user's driver activated folder 215.

Next, the native file may be destroyed by encrypting it with a random key and the key and file may be immediately zeroized, after which the file may be electronically shredded and/or deleted according to standard practices.

Whenever a user wants to read or modify a dispersed native file, all that needs to be done is open a PASF with the appropriate processor. Optionally, the VDCN can be configured in such a manner that users never know the native file or dispersed native file was replaced by a PASF. To access a shared file of the VDCN, a user makes an access request by activating access request module 216 which opens the appropriate GASF stub file 217 and causes the IDA module 221 to assemble the GASF and convert it to a PASF using the user's DNA and write the newly created PASF to the user's driver activated folder 215. The IDA module 221 can then reassemble the native data when the user selects 127 its PASF.

Certificateless Multifactor Authentication

The term "optical code" as used herein refers to any form of image, or combination of images, that may convey information such as, for example, a bar code, QR Code, optical orthogonal code, MaxiCode, PDF417 2D barcode, or the like.

The term "device print" as used herein refers to a collection of unique information about a user's data processing device such as, for example, the microprocessor ID number, the motherboard ID number, the network interface card (NIC) MAC address, or any other component that has a digitally readable identifier, or any combination thereof.

For an information protection system to be secure, it is vital that users of the system be authenticated by an agent of competent authority. The agent of competent authority today is commonly the digital certificate authority ("CA" or "certificate"), which is one of the components of public key infrastructure ("PKI"). PKI comprises the hardware, software, people, policies, and procedures needed to create, manage, distribute, use, store, revoke, and manage public-key authentication and encryption. The purpose of a PKI is to facilitate secure electronic transfer of data for a plurality of network activities such as, for example, internet banking, ecommerce, and confidential email. It is required for activities where simple passwords are inadequate.

The public disclosure of "secure key exchange" and "asymmetric key algorithms" in 1976 by Diffie, Hellman, Rivest, Shamir, and Adleman made PKI the world standard for secure communications. But that was over 40 years ago, and PKI is still the world standard. PKI worked because the number of mathematical calculations it takes to crack a PKI key are extremely large.

The first commercial microcomputer, the Altair 8080, entered the marketplace in December of 1974. It used a single Intel 8080, 8-bit microprocessor chip. It was hailed as a marvel then, but it could not keep pace with a child's pocket calculator today. When PKI was born, nothing but the most powerful mainframe computers had any chance at all of cracking PKI. Today the Chinese Tianhe-2 supercomputer runs at 33.86 quadrillion floating point operations per second. Currently PKI digital certificates are routinely forged by state supported hackers from around the world. This needs to change.

A certificate authority is supposed to prove you are you. It is generally accepted in cryptography that in order to prove you are you, credentials employing three-factors must be used. Those three factors are, for example, "something you have" (username, id card), "something you know" (shared secret, password), and "something you are" (fingerprint, face print, retinal scan). For authentication purposes three-factor authentication is superior to digital certificates.

The hardest problem to solve in cybersecurity is the human equation. Certificates can be difficult to install correctly, but they are easy and convenient for people to use. It is not uncommon in low to medium security areas to find a computer's username and password taped to the underside of the device's keyboard. How do you create a login and authentication system that forces people to comply, voluntarily or not, with safe security policies?

Carrying or wearing "something you have" such as, for example, a debit card or ID card, plus knowing something such as, for example, a personal identification number ("PIN") or password is easy to use. It must be in only your possession at all times. The problem there is cards require a card reader which is costly and cumbersome to use for most cloud-based Internet authentication systems. Also, without providing the "something you are" component, a card and PIN are too weak for modern security. They do not prove you are you. Fingerprint options are becoming more commonplace of late but they frequently throw false positives due to hardware and software issues, plus their efficaciousness varies from manufacturer to manufacturer. Furthermore, natural factors such as, for example, the hydration level of the finger being assayed normally causes variations.

Figure 3A:
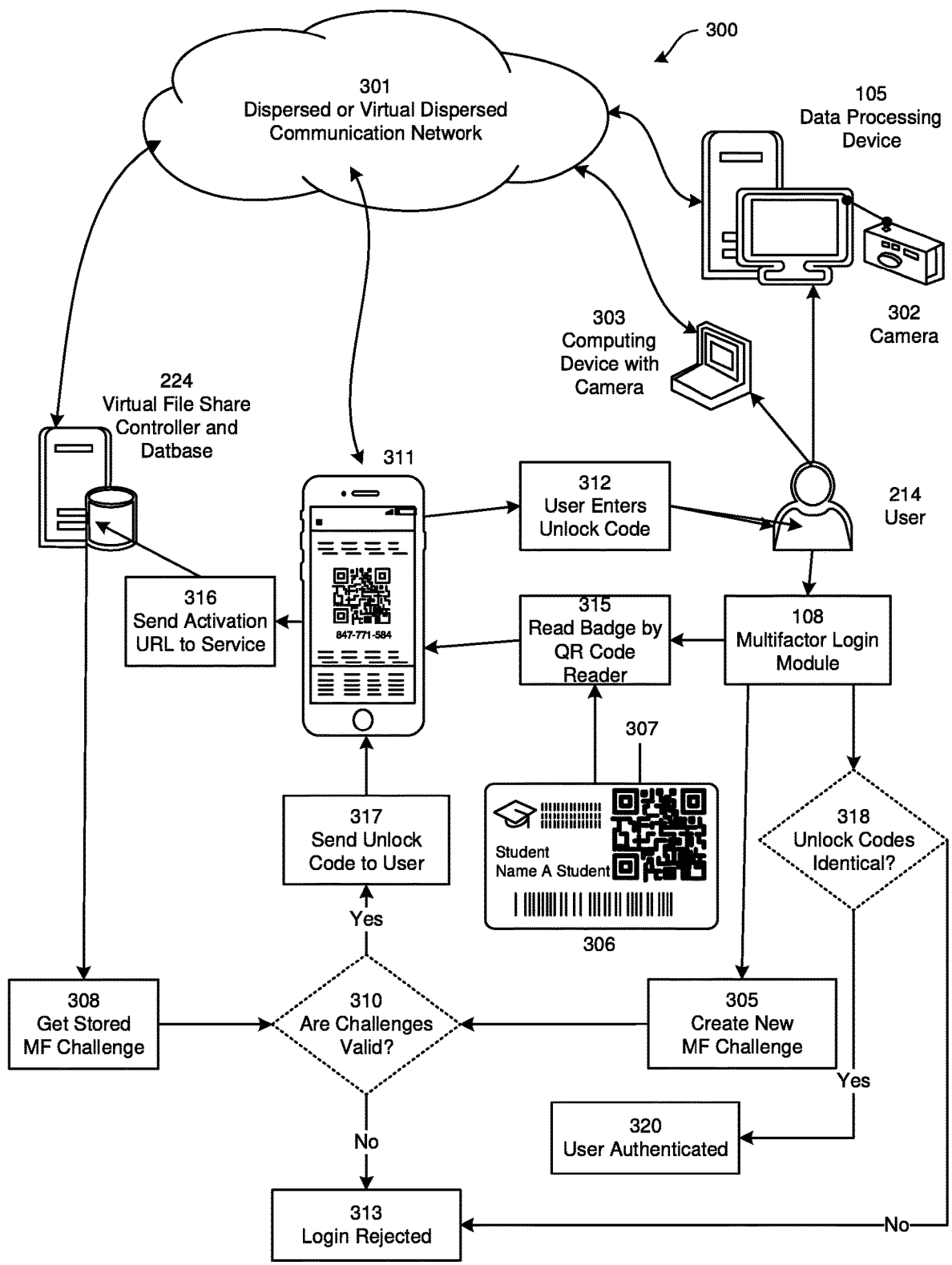
FIG. 3a is a schematic representation of a system 300 for providing secure multifactor authentication according to a disclosed embodiment.

FIG. 3a provides a schematic representation of a system 300 for providing multifactor authentication for personal identification which does not require a biometric assay. Instead, it relies on common items people generally carry with them as proof of identity, plus network, device, and other factors that may be combined to produce positive personal identification. System 300 includes a dispersed or virtual dispersed communication network 301, at least one data processing device 105, of system 100, a digital camera 302, and/or a computing device with a built in camera 303, a multifactor login module 108, of system 100, an identification card 306 displaying at least one optical code 307, a virtual file share controller and database 224, of system 200, and a cellular smart phone 311.

Description of the Enrollment Process

The term "badge identification code" as used herein refers to any unique identifier that binds an identification card to a user such as, for example, a sequence of alphanumeric characters, a sequence of digits, a binary sequence, a Global Unique Identifier (GUID), and the like, or any combination thereof.

Figure 3B:
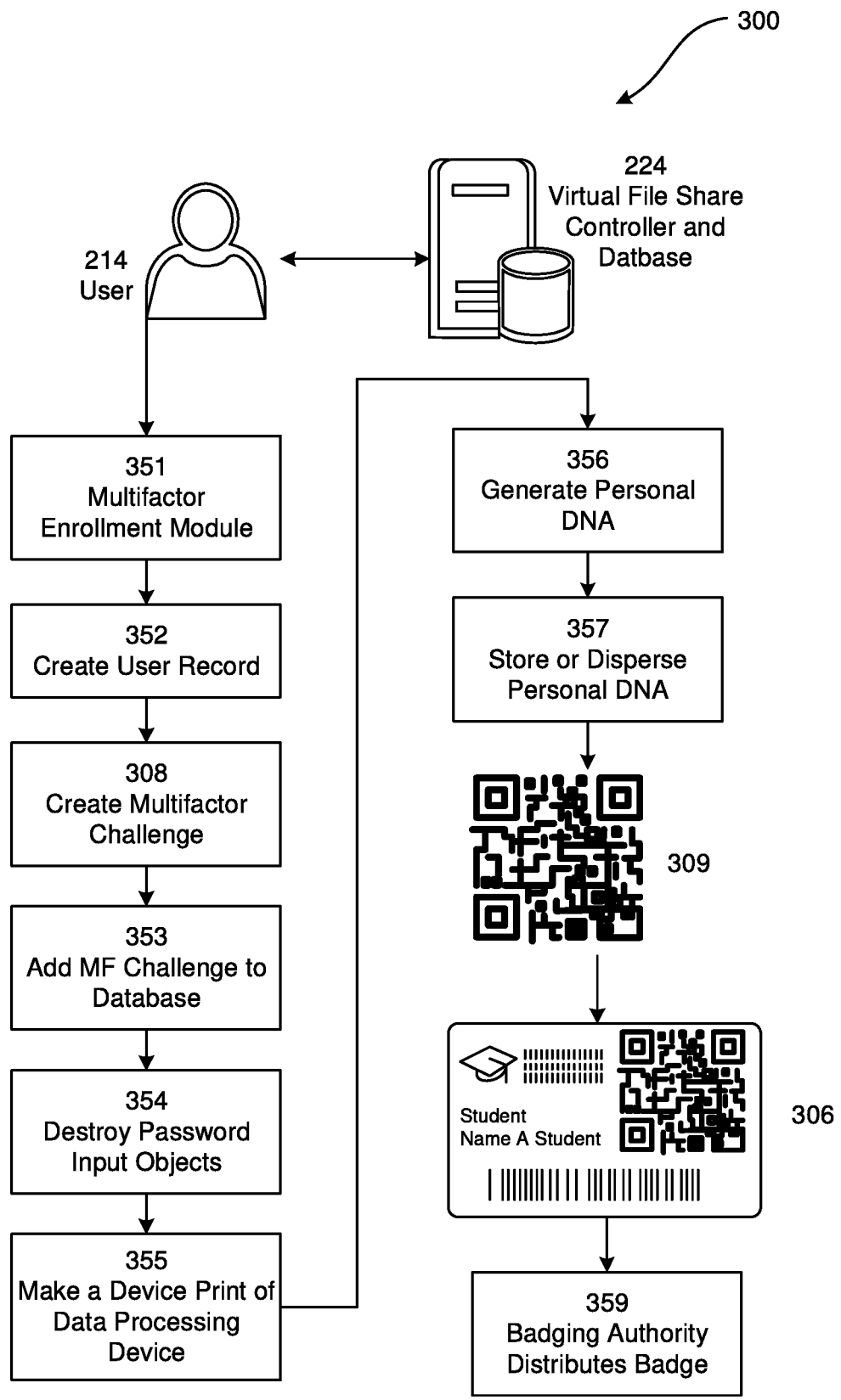
FIG. 3b is a flow chart representation of a system 300 for providing secure multifactor authentication according to a disclosed embodiment.

FIG. 3b provides a flow chart representation of a system 300 for providing multifactor authentication for personal identification. System 300 further includes a user 214 of system 200, a virtual file share controller and database 224 of system 200, a multifactor enrollment module 351 for collecting authentication information, a badge or ID card 306 that includes an optical code which may represent, for example, a unique user identification number and other information such as, for example, a Diffie-Hellman public key of the user, and other information such as, for example, a unique multifactor challenge (the "MF Challenge") generated from the user's password, Personal DNA and/or other confidential personal information.

A user 224 of system 200 first needs to be enrolled in the multifactor authentication system by a network administrator or security administrator to whom the user is personally known and validated. During the multifactor enrollment process the multifactor enrollment module 351 collects user input data such as, for example, a unique username and a password plus such other confidential personal information as the administrator may desire. The username may be checked for uniqueness by the virtual file share controller and database 224 or by an outside validation module such as, for example, Microsoft Active Directory. If unique, a record 352 for the new user may be created in the database 224. The password may be, for example, input by the user into a code text object and piped immediately into a byte array without ever being a string data type. Then it may be cryptographically processed to create a non-reversible MF Challenge 308. The MF Challenge or a portion of the MF Challenge may then be added 353 to the user's database record 224.

The password would not be saved; it would be immediately destroyed by means of, for example, zeroizing and nulling the byte array, and clearing and disposing the input text object 354. In addition, a device print 355 may be made of the user's data processing device 105 of system 100 plus additional personal and environmental data may be collected. Any or all of this information may be cryptographically combined to create a personal encryption key primitive, i.e. "Personal DNA" 356 for generating encryption keys, and for identification and authentication purposes.

Personal DNA may be stored or dispersed 357 with an IDA module such as, for example, IDA module 221 of system 200, and the fragments securely stored in a manner consistent with the present disclosure. The MF Challenge may also be dispersed with an IDA module such as, for example, IDA module 221 of system 200, and the fragments securely stored in a manner consistent with the present disclosure. An optical code may be generated such as, for example, a QR Code 309, which includes the URL address of the virtual file share controller and database 224. The URL address may include the MF Challenge, or a portion of the MF Challenge, along with other authentication factors that may be protected by, for example, a Diffie-Hellman private key and optionally be protected by at least one fragment of a key primitive created from Personal DNA. In addition, it may contain data or metadata, or any combination of the foregoing. The QR Code comprising such information may be included on the front or back of ID card 306 and distributed to the user by a badging supervisor 359.

In an embodiment of the present disclosure the ID card 306 may be shown to, for example, a data processing device 105 of system 100, or computing device 303, or the like that have an embedded or attached camera. If the digital processing device does not have a digital camera, or have access to a digital camera, the user's cell phone 311 may capture the image of the badge identification code 315. The optical data carrier of the authentication information may be any form of optical code. If optical code were used as a means of authorization according to conventional wisdom it would not be cryptographically relevant. The present embodiment discloses a cryptographically relevant means of employing optical codes such as, for example, a high definition QR Code 307 which can contain up to 1,852 alphanumeric characters. That is enough data to encode, for example, a Diffie-Hellman public key and at least one fragment of a Personal DNA or a key primitive created during the enrollment process, and may also contain data or metadata, or any combination thereof.

The present enrollment process may be structured so users can safely enroll themselves on their data processing devices without the need of a network administrator directly interacting with the user's data processing device, provided users are required to pick up their badges from a badging authority 359 which can securely establish the identity of the user and the validity of the optical code with respect to that user.

Description of the Login Process

Typically a user would login to the DCN or VDCN by entering at least a username and passphrase into the login screen of the multifactor login module 108 (see FIG. 3a). The multifactor login module 108 would also generate a random, single use, unlock code such as, for example, 9QN-A23, that may be stored by the multifactor login module until it can be compared to a copy of the unlock code that will be sent to the user's cell phone if the balance of the login process proves valid. Then the user may show the ID card 306 to the user's computing device camera 302 or 303 or cell phone 311. The computing device or cell phone would have an optical code reader/scanner that would read the code and send 316 an activation code sequence, which may contain a URL, to the virtual file share controller and database 224. This would cause the share controller to retrieve the complete MF Challenge 308, or a portion of the complete MF Challenge that may be used to generate a complete MF Challenge 308. The multifactor login module would also generate a new comparison MF Challenge 305 in a manner similar to that used to generate the stored MF Challenge 308 during the enrollment process. MF Challenge 305 and MF Challenge 308 may each contain code that needs to be compared 310 in order to prove the authentication is valid. If the Challenges are not the same the user is rejected 313. If the Challenges prove valid the user's cell phone is sent a copy of the unlock code 317. It would not matter which device read the ID card because the cell phone number, which was entered by the user during the enrollment process, would be sent the unlock code. The unlock code may be sent to a receiver such as the user's cell phone as a SMS text message, as an SFTP transmission, or by any other wired or wireless means. The user would respond by keying 312 the unlock code into the multifactor login module 108 of computing device 105 or 303. The stored unlock code would then be compared to the keyed-in unlock code 318. It the unlock codes are identical the user would be accepted as valid 320, and if not the user would be rejected 313.

Using Microsoft Active Directory with Certificateless Multifactor Authentication The term "enterprise network" as used herein refers to an organization's communications backbone that helps connect computers and related devices across departments and workgroup networks, facilitating insight and data accessibility.

The term "sensitive information" as defined herein refers to information that is protected against unwarranted disclosure, which may be required for legal or ethical reasons, for issues pertaining to personal privacy, or for proprietary considerations.

The term "proprietary information" as defined herein refers to information that is not public knowledge (such as financial data, formulas, source code, test results, secret processes, trade secrets, and the like) which may be viewed as the intellectual property of the holder. The recipient of proprietary information such as, for example, a contractor in the procurement process, is generally duty bound to refrain from making unauthorized use of the information.

The term "unclassified secret information" as used herein refers to information that is only known by one person or a few people and should not be told to others.

The term "classified information" as used herein refers to any information or material, regardless of its physical form or characteristics, that is owned by the United States Government, and determined pursuant to Executive Order 12356, Apr. 2, 1982 or prior orders to require protection against unauthorized disclosure, and is so designated.

Generally enterprise networks require an authentication manager such as, for example, Active Directory ("AD") to control and restrain user access to network data. AD authorization is generally considered safe for protecting general information. Recent advances in the science of unethical hacking have made it prudent to require users with access to sensitive information and proprietary information to employ stronger means of authentication than AD may provide, and for users with access to unclassified secret information or classified information employing a stronger means of authentication should be mandatory. The present embodiment provides a strong certificateless non-biometric means of user authentication, relying on common items people generally carry with them as positive proof of identity. It is a feature of the present embodiment that it has utility to function compatibly with AD to provide a low maintenance means of managing authentication for large-scale enterprise networks by extending authentication security while substantially functioning beneath the awareness of network administrators and users.

One skilled in the art will appreciate that the use of certificates and/or biometric proof, or other relevant means, may be added to the system and methods of the present embodiment for providing an even stronger means of authentication.

Figure 4:
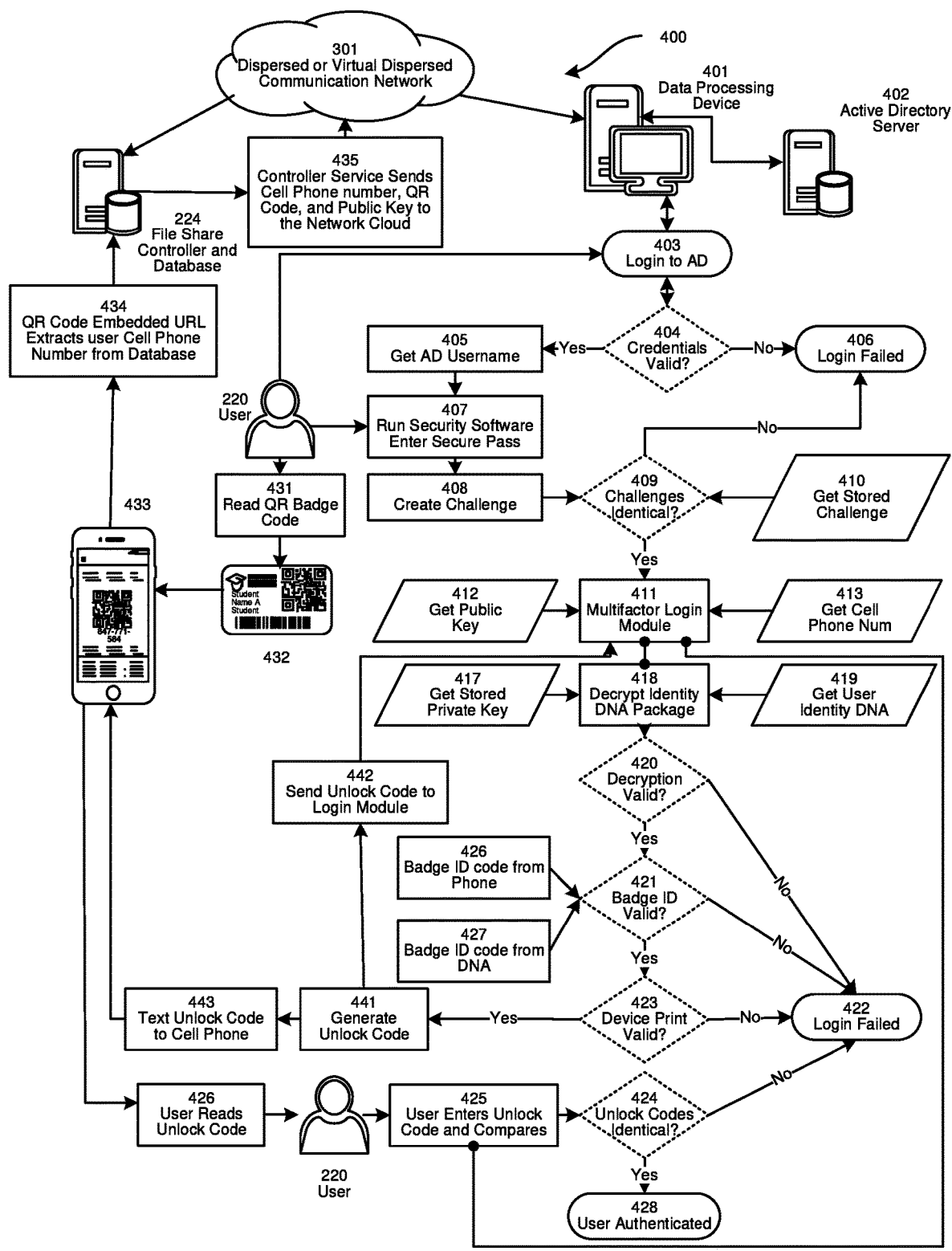
FIG. 4 is a schematic representation of a system 400 for providing an alternate secure multifactor authentication according to a disclosed embodiment.

FIG. 4 provides a schematic representation of a system 400 for providing multifactor authentication for personal identification which does not require a biometric assay. System 400 includes a dispersed or virtual dispersed communication network 301 of system 300, at least one data processing device 401, an Active Directory server 402, at least one file share controller and database 224 of system 200, at least one user 220, a cell phone 433 capable of reading an optical code, an identification badge with an optical code imprinted on it 432, and a multifactor login module 411.

Description of the Alternate Login Process

First Authentication Layer:

Typically a user of an enterprise network would initiate a login process 403 using a data processing device 401. Authentication software running in the data processing device would present the user with a login form (not shown). The user would enter 403 credentials such as, for example, a username and password which would be sent to the AD server 402 for verification. If the credentials match 404 a set of credentials present in the AD server, a validated message is returned. Otherwise login fails 406.

Second Authentication Layer:

If the user was enrolled in a manner consistent with the present embodiment, the user was assigned the AD username as the secure username 405. Consequently, all a user needs to do is launch the security software and enter a secure password 407. The secure password should not be the same as the AD password. In addition, the network administrator may require the secure password to be of greater complexity than the AD password such as, for example, requiring one uppercase character, one lowercase character, one digit, and one symbol, or any number or combination thereof.

When the secure password is entered it may cryptographically generate a challenge 408 in a manner similar to the means employed to cryptographically generate and store a challenge during the user's enrollment process. The security software would compare 409 the newly generated challenge with the stored challenge 410 and if they are identical the user could access the multifactor login module 411.

Third Authentication Layer:

The multifactor login module would prompt the user to use the phone 433 to scan the badge 432. An optical code reader (not shown) running in the phone would scan 431 the optical code on the user's identification badge 432. The optical code may include a URL that includes the public or private IP address of the file share controller 224 web service (not shown). In addition, the optical code may include one or more additional items of information such as, for example, the user's unique badge identification code, which may be, for example a GUID. Consequently, the complete URL may look like: https://www.domain.com/Unlock.aspx?id=340DFFC5-9DCE-42C7-8751-DED7A224101F.

In addition, an expiration timestamp of, for example, 5 minutes may be appended to the URL, which may cause the share controller to abort the transaction after the allotted time has expired. The badge identification code would cause the web service to extract the user's cell phone number from the web service database 434 and then send the cell phone number, the optical code, and optionally the user's public key which may have been stored in the file share controller's database, over the communication network 301 to the user's data processing device 401, thereby making the optical code and the additional items of information available for use by multifactor login module. Following a successful scan of the user's badge the user's phone web browser it may display a message such as, for example, "Your network access request was sent."

The multifactor login module 411 would then input the user's public encryption key 412 from the data processing device's memory, or from a storage location on the enterprise network, or the cloud, or other storage location. The login module would also import the registered user's cell phone number 413 from the data processing device's memory, or from a storage location on the enterprise network, or the cloud, or other storage location. The multifactor login module would then employ the user's private key 417 which may, for example, reside in the data processing device's memory, or from a storage location on the enterprise network, or the cloud, or other storage location and the user's public key 412 to decrypt 418 the user's personal identity package ("DNA") 419 which may contain various elements of unique data derived from the user's Personal DNA such as, for example, the username and identification badge code, and the user's environment information such as, for example, the microprocessor and/or motherboard serial numbers. During the enrollment process the user's personal identity package may have been encrypted using a public/private key pair such as, for example, those commonly generated by PKI, SSH, RSA, or any other such algorithm. If the user's personal identity package was successfully decrypted 420, and its DNA successfully decrypted, the badge identification code sent from the user's cell phone 433 can be compared with the badge identification code extracted from the DNA 421.

Fourth Authentication Layer: If the badge identification code comparison proved identical 421, the multifactor login module 411 may generate a device print in a manner similar to a device print that may have been generated from the user's data processing device and stored in the user's DNA during the user's enrollment process. The multifactor login module may then compare 423 the newly generated device print with the stored device print from the user's DNA. If any of steps 420, 421 or 423 fail, login has failed 422.

One skilled in the art will appreciate that additional comparisons between elements of personal information which may be sampled and stored during the user enrollment process may be compared with newly sampled elements of personal information which were acquired in a manner consistent with how such elements of personal information were acquired during the enrollment process such as, for example, a face print, finger print, palm print, retinal scan, and the like, or any combination thereof, to increase the authentication strength of the present embodiment.

Fifth Authentication Layer:

If the device prints are proved to be identical, multifactor login module may employ the stored cell phone number 413 to generate an "unlock code" 441 which is sent to the cell phone of the enrolled user 443 by means of, for example, a SMS text message. Then the user reads the unlock code 426 and keys it into the multifactor login module 425 where it may be compared with the unlock code that was previously sent to the multifactor login module 442. Typically, such unlock codes are short randomly generated block of numeric or alphanumeric data. If the unlock codes are identical 424, the user is authenticated 428. If not, login fails 422.

Optionally, the multifactor login module may also generate a substantially larger email message which may comprise random information, or it may comprise a cryptographically relevant block of information, an executable code block, or such other information that may be useful authentication information. The email information is too large to be typed in by the user. Consequently, it must be copied and pasted into multifactor login module. This technique has the added utility to deny would-be hackers using a kernel key logger access to the entire login process.

After the unlock code is sent the user's phone web browser it may display a message such as, for example, "Unlock code was sent to registered computing device."

Why the Present Embodiment May be as Strong as Many Biometric Solutions

Each user's cell phone number is unique worldwide, and each user's computing device's device print is unique worldwide. In addition, each user's username, password, and other verifiable data and metadata collected from, or on behalf of, the user during enrollment to generate a "challenge" and encryption key primitive have a high likelihood of being unique. There is also a high likelihood the optical code which may be created from the challenge, combined with other cryptographic processes, are also unique worldwide. When all of this is combined with the resources available on the DCN or VDCN, in a manner consistent with the present disclosure, the likelihood of the present embodiment generating a false positive identification is extremely small. The efficacy of this embodiment may even rival or exceed the statistical probability of success for many conventional biometric methodologies.

One skilled in the art will appreciate that the number and type of computing devices used and identification code examples depicted in FIG. 3a, FIG. 3b, and FIG. 4 are for illustrative purposes only.

Application Virtualization

The terms "application virtualization" and "full application virtualization" as used interchangeably herein refer to software technology that encapsulates application software from the underlying operating system on which it is executed. A fully virtualized application is not installed in the traditional sense, although it is executed as if it were. The application behaves at runtime like it is directly interfacing with the original operating system and all resources managed by it may be isolated or sandboxed to varying degrees.

Modern operating systems such as, for example, Windows and Linux may include limited application virtualization. That notwithstanding, full application virtualization requires a virtualization layer. Application virtualization layers replace part of the runtime environment normally provided by the operating system. The virtualization layer intercepts all disk input and output ("I/O") operations of virtualized applications and transparently redirects them to a virtualized location, often a single file. The application remains unaware that it accesses a virtual resource instead of a physical one. Since the application is now working with one file instead of many files spread throughout the system, it becomes easy to run the application on a different computer and previously incompatible applications can be run side-by-side. Examples of this technology for the Windows platform include Spoon (formerly Xenocode), Microsoft Application Virtualization, Symantec Workspace Virtualization, Citrix XenApp, VMware ThinApp, and Oracle Secure Global Desktop.

A major benefit of application virtualization for maintaining high security environments is it allows sensitive information and components of information to be isolated inside the virtualization layer where users and administrators cannot gain access to it. In addition, applications that employ secret unpublished proprietary encryption algorithms, or other algorithms and processes that protect data may be able to process data in such a manner that it would be a near-impossibility to crack the encryption without first reverse engineering the software. Such a virtual application, which runs entirely in RAM, may never have its object code exposed to hackers. Consequently, it would be an extremely difficult task to reverse engineer such a virtual application.

Rapid Data Processing Running Multiple Concurrent Virtual Applications

Another major benefit of application virtualization is multiple iterations of the same virtualized application can simultaneously process the same batch of data. This is especially useful for dispersing and reassembling Big Data and for new installations which have large amounts of native data that need immediate dispersal.

Figure 5A:
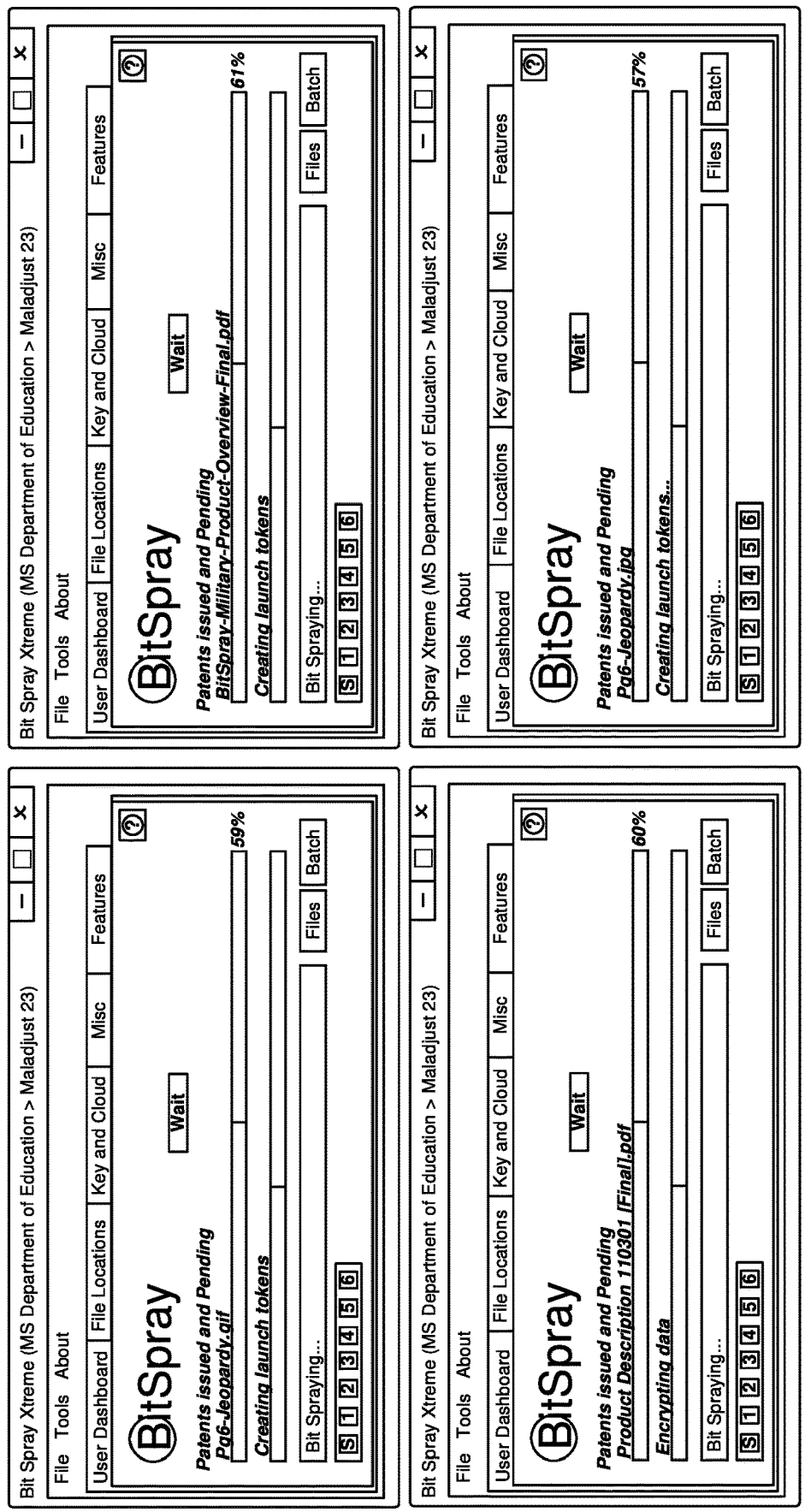
FIG. 5a is a computer screen shot of four virtual applications concurrently dispersing a batch of original files.

FIGS. 5a-5b show a screen shot of four virtual applications concurrently dispersing a batch of files. It is not known how many iterations can run simultaneously on a single computing device. With adequate RAM and at least one iteration per CPU core, possibly two or more iterations can run per CPU core. The "MultiApp" technique was benchmarked using a test group of 94 files of various types and sizes (151 MB) in a file tree with 12 complex nestings. A single machine running four virtualized applications dispersed the batch in 3.0 minutes and reassembled it in 2.3 minutes. Four machines, launched within 2 to 3 seconds of saying "go" took 32.6 seconds to disperse and 1.2 minutes to reassemble. The difference between single reassembly and multi-reassembly benchmarks was due to the need to reset each reassembled file's metadata and attributes after reassembly to validate the reassembled file was identical to the original in every respect. The screen shot is the actual batch run of the data cited above.

The Dataless Database

Database operations can be virtualized like any other computer process. A database is really two entities: DB-in-motion and DB-at-rest. By its nature, part of a database is always on, always in motion. This is not true of all information in all of its tables and indices but it is true of a substantial data landscape that is constantly changing. Information dispersal can automatically protect DB-at-rest by creating real-time software or kernel drivers that work with enabled folders to automatically intercept data that is being written to disk and encrypting it before it is written to disk. Such encrypted information is complete information and if downloaded by a hacker it may be decrypted with the right resources and sufficient time. A better solution may be to automatically capture the data and disperse it to multiple geographically separated locations. Consequently, securing DB-at-rest may be a straightforward task.

Protecting DB-in-motion may be accomplished by applying the systems and methods of the present disclosure, or adaptations thereof. For instance, if instead of holding complete information in tables, the tables may be comprised of small blocks of symbolic data such as, for example, access symbol files (ASF) which, for example, may function as "smart" IDA event handlers that initiate assembly and disassembly of table information. For such a system, assembled information may only persist in a discernible state for the brief period of time in the electronic memory of an enrolled user's computing device where it is required to interact with the user, other information, computer operations, or any other operation relying upon information in a discernible state. After such use it may be zeroized.

The IDA operations used for such database processes may be very lean and fast. Moreover, the IDA algorithm could be programed into, for example, a field-programmable gate array (FPGA), or an application-specific integrated circuit (ASIC), which may further be combined with at least one specialized data processing unit (DPU) to further facilitate hardware acceleration.

SharePoint Integration

The term client-server model as used herein refers to a distributed application structure that partitions tasks or workloads between the providers of a computer resource or service i.e. a server, and a service requester, i.e. client. Typically, clients and servers communicate over a computer network on separate hardware, but both client and server may reside in the same system. A server host may run one or more server programs which share their resources with clients. A client does not share any of its resources but requests a server's content or service function. Clients therefore initiate communication sessions with servers which await incoming requests.

Microsoft SharePoint is the world leader for file sharing and collaboration solutions among a multitude of global users. SharePoint is a client-server model web application platform in the Microsoft Office server suite. It combines various functions which are traditionally separate applications: intranet, extranet, content management, document management, personal cloud, enterprise social networking, enterprise search, business intelligence, workflow management, web content management, and an enterprise application store. SharePoint servers were traditionally deployed for internal use in mid-size businesses and large departments alongside email and calendaring software such as Microsoft Exchange, video conference software such as Skype for Business, and business software such as Office Web Apps; but business software, such as Microsoft's 'Office 365' software as a service offering (which includes a version of SharePoint), has led to increased usage of SharePoint by smaller organizations.

Typically there are two SharePoint operating modes. The first is a client-server model that has multiple locations on a network such as, for example, the DCN or VDCN where processes of the present disclosure could be layered for the purpose of securely sharing data among users and groups of users.

Accordingly, the first operating mode may read or write tables from the SharePoint server's hard drive which may be accessed by means of a real-time software application or driver activated folder 215, of system 200, connected to a SharePoint service running on the server. The service may be connected to the DCN or VDCN, and further connected to the user's computing device, and ultimately the user. Alternately, the second operating mode connects the SharePoint server hard drive to the SharePoint service that may further connect to the DCN or VDCN and then to the user computing device, which may be connected to the user's driver activated folder 215 of system 200.

In the first operating model, a SharePoint server reassembles share volumes into native objects such as, for example, Word documents and Excel spreadsheet. Consequently, SharePoint is aware of what type of information it is processing. Using this operating model, at least one IDA module 221 would be running on the SharePoint server. Additionally, the MultiApp technique of FIG. 5 may be employed to spawn a plurality of VTCs running IDA modules such as, for example, IDA module 221. This operating model would be less secure than the second operating model because reassembled native data may be transmitted over an exposed network connection between the user's computing device and the SharePoint server.

According to the second operating model, the SharePoint server would serve indiscernible share volumes to the user's computing device where they would be would be reassembled by the App or VTC into reassembled native data. Discernible native data typically would not be exposed on the network. This operating model provides greater security, but it may not allow for extended functionalities SharePoint may provide if it was aware of the type of information it was serving. There is also an administrative difference, since an App or VTC would have to run on every user's computing device.

Beyond the foregoing consideration and despite the enormous complexity of SharePoint's data processing, sharing, and collaboration functionality, all of that is SharePoint's "front end." The front end works with the users and their manifold data processing systems and methods. On the "back end" of the equation it reads, writes, and transmits data, i.e. "SharePoint I/O." The methods and techniques taught by the present disclosure could interact with, or extend, the SharePoint I/O to provide an extra layer of information security and persistence.

The invention claimed is:

1. A method of obtaining data in a system in which share volumes of the data are dispersed across a communication network, the method comprising:
   a first computer requesting the data in a request;
   forwarding the request to a second computer;
   the second computer determining if another computer has reassembled the data;
   the second computer causing the first computer to be informed that the request cannot be granted when the data has been reassembled by another computer; and
   the second computer enabling the first computer to perform the following actions when the data has not been reassembled by another computer:
      accessing first personal information associated only with a user of the first computer, the first personal information being required to authorize the user to access the data,
      using the first personal information to determine reassembly information necessary to reassemble the data,
      using the reassembly information to reassemble the data,
      destroying the first personal information after the data has been reassembled, dispersing, after the destroying, the reassembled data across the communication network to create dispersed data, and creating second personal information for the user that is necessary to reassemble the dispersed data.

2. The method of claim 1 wherein multiple users each have personal information unique to each user that authorizes each user to access the dispersed data.

3. The method of claim 1 wherein:

the second computer performs the determining by checking for the existence of a file or entry in a database associated with the request;

the second computer creates the file or entry in the database associated with the request when the second computer enables the first computer to access the dispersed data in response to a new request; and the second computer deletes the file or entry in the database associated with the request when the reassembled data has been dispersed.

4. The method of claim 1 wherein:

the communication network is a dispersed communication network;

the first computer is associated with the user; and the second computer interfaces between the first computer and a cloud network storing the share volumes.

5. The method of claim 1, wherein the first computer, upon receiving a native file:

moves the native file to a hidden folder in a user kernel space of the first computer;

replaces the native file with a pointer which points to the native file in the hidden folder; and causes the native file to be dispersed across the communication network.

6. The method of claim 5, wherein the first computer causes a file name, metadata and attribute of the pointer to be the same as the native file.

7. The method of claim 1, wherein the dispersing includes dispersing the reassembled data to at least one different storage device than a storage device from which the reassembled data was reassembled.

8. The method of claim 7, further comprising abandoning at least one of the share volumes.

9. The method of claim 1, further comprising the first computer editing the reassembled data before dispersing the reassembled data.

10. A system for obtaining data in which share volumes are dispersed across a communication network, the system comprising:

a first computer constructed and arranged to request data in a data request and send the data request; and a second computer constructed and arranged to receive the request, determine if another computer has reassembled the data, and send information to the first computer that the request cannot be granted when the data has been reassembled by another computer, and enable the first computer to obtain the data when the data has not been reassembled by another computer, wherein the first computer is also constructed and arranged to:

access first personal information associated only with the user of the first computer, the first personal information being required to authorize the user to access the data, use the first personal information to determine reassembly information necessary to reassemble the data, use the reassembly information to reassemble the data, destroy the first personal information after the data has been reassembled, disperse, after the first personal information is destroyed, the reassembled data across the communication network to create dispersed data, and create second personal information for the user that is necessary to reassemble the dispersed data.

11. The system of claim 10 further comprising multiple first computers, each capable of requesting the dispersed data.

12. The system of claim 10 wherein the second computer is also constructed and arranged to:

perform the determining by checking for the existence of a file or entry in a database associated with the request;

create the file or entry in the database associated with the request when the second computer enables the first computer to access the dispersed data in response to a new request; and delete the file or entry in the database associated with the request when the reassembled data has been dispersed.

13. The system of claim 10 further comprising the communication network, wherein:

the first computer is associated with the user; and the second computer interfaces between the first computer and a cloud network storing the share volumes.

14. The system of claim 10, wherein the first computer includes a hidden folder in a user kernel space, and the first computer is constructed and arranged to:

move a native file to the hidden folder;

replace the native file with a pointer, which points to the native file in the hidden folder; and cause the native file to be dispersed across the communication network.

15. The system of claim 14, wherein the first computer is constructed and arranged to cause a file name, metadata and attribute of the pointer to be the same as the native file.

16. The system of claim 10, wherein the first computer disperses the reassembled data to at least one different storage device than a storage device from which the reassembled data was reassembled.

17. The system of claim 16, wherein the first computer abandons at least one of the share volumes.

18. The system of claim 10, wherein the first computer is constructed and arranged to edit the reassembled data before dispersing the reassembled data.

* * * * *